United States Patent
Smith

(10) Patent No.: US 10,489,799 B2
(45) Date of Patent: Nov. 26, 2019

(54) TRACKING PERFORMANCE OF DIGITAL DESIGN ASSET ATTRIBUTES

(71) Applicant: Adobe Inc., San Jose, CA (US)

(72) Inventor: Kevin Gary Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 185 days.

(21) Appl. No.: 15/586,081

(22) Filed: May 3, 2017

(65) Prior Publication Data

US 2018/0322513 A1 Nov. 8, 2018

(51) Int. Cl.
*G06Q 30/02* (2012.01)
*G06F 16/907* (2019.01)
*G06F 16/2455* (2019.01)

(52) U.S. Cl.
CPC ... *G06Q 30/0201* (2013.01); *G06F 16/24556* (2019.01); *G06F 16/907* (2019.01)

(58) Field of Classification Search
CPC .............. G06Q 30/0201; G06F 16/907; G06F 16/24556
See application file for complete search history.

(56) References Cited

U.S. PATENT DOCUMENTS

| | | | |
|---|---|---|---|
| 8,812,647 B1 * | 8/2014 | Jain ...................... | G06Q 10/10 709/223 |
| 9,305,105 B2 * | 4/2016 | Nandy ................... | G06Q 30/02 |
| 2003/0120641 A1 * | 6/2003 | Pelletier ............. | G06F 16/24573 |
| 2009/0192870 A1 * | 7/2009 | White .................... | G06Q 30/00 705/7.29 |
| 2011/0231245 A1 * | 9/2011 | Bhatia .................... | G06Q 30/02 705/14.43 |
| 2011/0288937 A1 * | 11/2011 | Manoogian, III . | G06Q 30/0251 705/14.66 |
| 2012/0253923 A1 * | 10/2012 | Durvasula .......... | G06Q 30/0255 705/14.43 |
| 2013/0085804 A1 * | 4/2013 | Leff .................... | G06O 30/0219 705/7.29 |
| 2013/0211909 A1 * | 8/2013 | Tanaka ............... | G06Q 30/0246 705/14.45 |
| 2013/0231974 A1 * | 9/2013 | Harris ................ | G06Q 30/0201 705/7.29 |
| 2014/0052548 A1 * | 2/2014 | Dokken, Jr. ........... | G06Q 50/01 705/14.73 |
| 2014/0067518 A1 * | 3/2014 | McGovern ......... | G06Q 30/0201 705/14.41 |
| 2014/0236720 A1 * | 8/2014 | Shunock ................ | G06Q 30/02 705/14.54 |

(Continued)

*Primary Examiner* — Sujay Koneru
(74) *Attorney, Agent, or Firm* — Keller Jolley Preece

(57) ABSTRACT

Methods and systems for analyzing usage and performance of attributes in digital design assets for asset creation. In particular, one or more embodiments maintain a digital design asset repository containing a plurality of digital design assets available for use in marketing campaigns. One or more embodiments assign attribute identifiers to attributes of the digital design assets. One or more embodiments then track usage of digital design assets in one or more marketing campaigns. Based on the tracked usage, one or more embodiments aggregate analytics data for the attributes and then determine a performance of the attributes using the aggregated analytics data. Additionally, one or more embodiments provide the aggregated analytics data for the attributes in the digital design asset repository.

20 Claims, 12 Drawing Sheets

(56) References Cited

U.S. PATENT DOCUMENTS

| | | | |
|---|---|---|---|
| 2015/0071427 A1* | 3/2015 | Kelley | G06Q 30/0202 |
| | | | 379/265.09 |
| 2017/0017986 A1 | 1/2017 | Mathis et al. | |
| 2017/0193546 A1* | 7/2017 | Bennett | G06Q 30/0244 |
| 2018/0005274 A1* | 1/2018 | Calvillo | G06Q 30/0242 |
| 2018/0322513 A1* | 11/2018 | Smith | G06F 16/24556 |

* cited by examiner

TRACKING PERFORMANCE OF DIGITAL DESIGN ASSET ATTRIBUTES

BACKGROUND AND RELEVANT ART

Analytics companies track user interactions to generate analytics reports. Analytics reports detail user interactions with advertisements, user visits to websites, user purchases, and other interactions. The data gathered by analytics reports can provide valuable insights. For example, analytics reports can help entities learn which marketing campaigns are successful and which campaigns are not successful. Analytics reports can also help entities learn where and when advertising can be most effective for converting potential customers into customers.

When determining whether a marketing campaign is successful, analytics companies traditionally rely on analytics reports that describe a usage and performance of the campaigns themselves. For example, analytics reports describing marketing campaigns can include indications of where and how often the campaigns were used, how many users interacted with the campaigns, how many conversions resulted from the campaigns, demographics associated with interactions/conversions, etc. While analytics reports that describe the performance of marketing campaigns are useful in determining how a specific campaign performs, such reports do not provide information of individual components that can be used in multiple marketing campaigns. Thus, it is often difficult for advertisers and commercial entities to determine how well individual creative assets are performing.

Additionally, because traditional methods of gathering analytics data for marketing campaigns do not determine usage and performance of individual components in the campaigns, creators of the components are often unaware of the use or performance of their own creations. For example, if an asset is used in a successful marketing campaign, the creator of the asset may never know exactly how well the asset performed or if the asset was responsible for the campaign's success. Furthermore, the lack of information about the asset may make it difficult for the creator to know which aspects of the asset resulted in the performance of the asset in the marketing campaign, or how to improve the asset and/or how to create new successful assets.

These and other disadvantages may exist with respect to conventional marketing analytics tracking techniques.

SUMMARY

One or more embodiments provide benefits and/or solve one or more of the foregoing or other problems in the art with systems and methods for analyzing performance of attributes of digital design assets. In particular, one or more embodiments of the disclosed systems and methods track usage of digital design assets across one or more marketing campaigns. The systems and methods aggregate analytics data for individual attributes used in the digital design assets based on attribute identifiers associated with the digital design assets. Based on the aggregated analytics data, the systems and methods determine a performance of each individual attribute used in one or more digital design assets across one or more marketing campaigns and in connection with one or more audience segments.

One or more embodiments also provide performance information that allows content creators to more accurately create targeted digital design assets. Specifically, the systems and methods provide the performance information for individual attributes used in one or more digital design assets across one or more content creation applications or platforms. Thus, the systems and methods allow users to use past performance of attributes with various audience segments to create or modify digital design assets that are more likely to perform well with the various audience segments.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
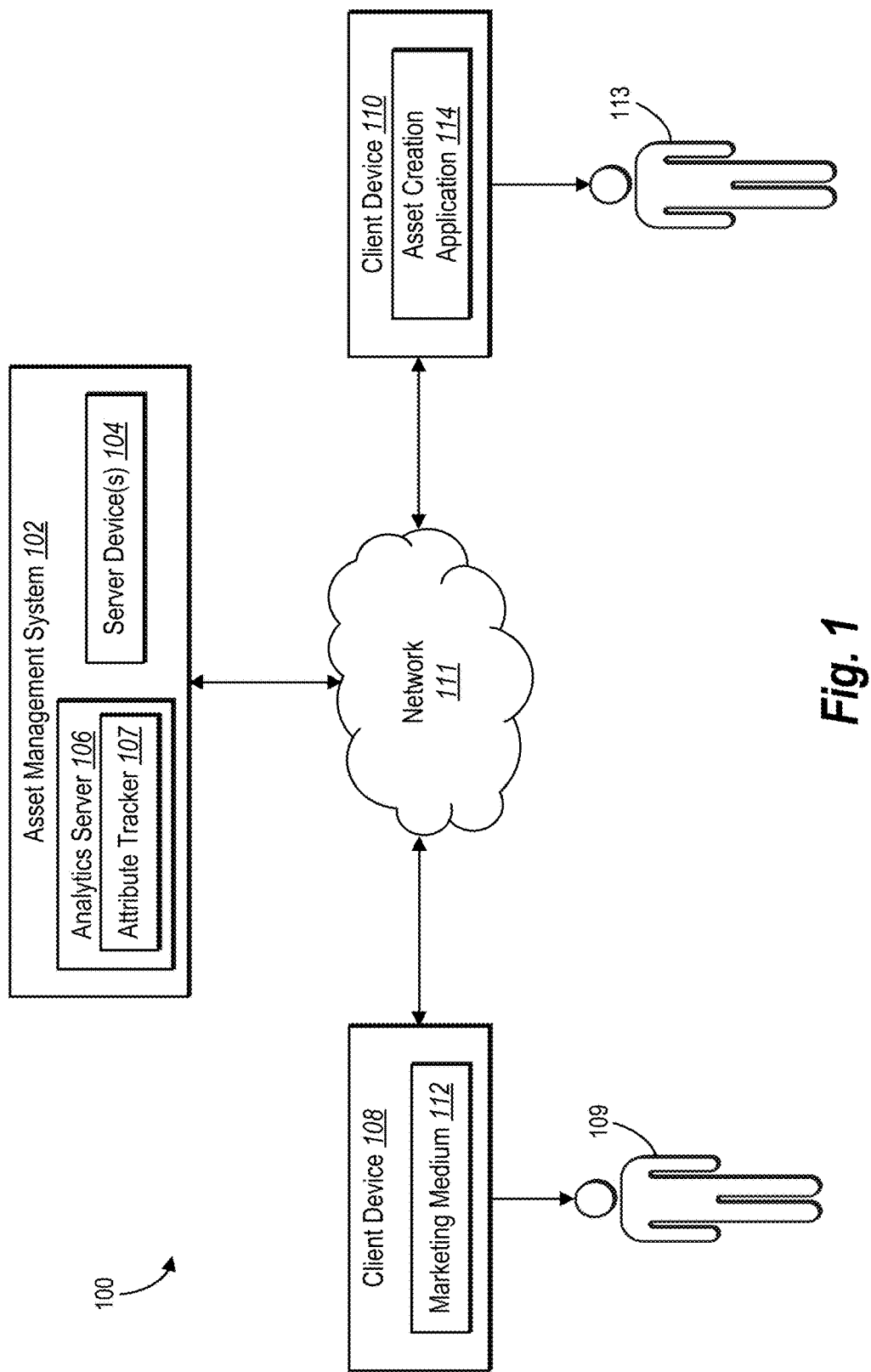
FIG. 1 illustrates an environment in which an asset management system can operate in accordance with one or more embodiments.

One or more embodiments of the present disclosure include an asset management system for analyzing usage and performance of individual attributes of digital design assets. In particular, one or more embodiments of the asset management system track usage of digital design assets (e.g., digital images, video files or audio files) across various marketing campaigns and via various marketing media or platforms. Additionally, the asset management system determines, based on the usage of the digital design assets, performance of various attributes (e.g., visual attributes such as colors, font settings, and subjects) of the digital design assets within the one or more marketing campaigns and for different audience segments. Thus, the asset management system can track and provide information about the performance of the individual attributes of a plurality of digital design assets, allowing content creators, advertisers, or other entities to have a better understanding of why certain digital design assets are successful/unsuccessful with certain audience segments.

In one or more embodiments, the asset management system can maintain a digital design asset repository that includes a plurality of digital design assets. Specifically, the digital design asset repository includes digital design assets used in various marketing campaigns. For example, an asset creator can generate digital design assets for use in marketing campaigns and store the digital design assets in the digital design asset repository. When delivering content in connection with a marketing campaign, the asset management system can access the digital design asset repository to select one or more of the digital design assets to deliver to client devices of potential consumers.

Additionally, each digital design asset includes one or more attributes that the asset management system tracks by assigning attribute identifiers to each of the attributes in the digital design assets. In particular, the asset management system assigns unique attribute identifiers to the attributes of the digital design assets to distinguish the attributes from the digital design assets themselves. The unique attribute identifiers also allow the asset management system to analyze the attributes independently from the marketing campaigns.

Furthermore, the asset management system is able to determine the performance of each individual attribute independently from their respective digital design assets. Specifically, the performance of an attribute indicates impressions, clicks, conversions, etc., of one or more assets that have included the attribute. The asset management system determines usage and performance of the attributes across various marketing campaigns based on the presence of the attributes in various digital design assets. Additionally, the asset management system determines the performance of an attribute with respect to one or more audience segments. Furthermore, the asset management system can also generate performance scores for attributes based on aggregated analytics data corresponding to the attributes, which indicates how well the attributes performed relative to other attributes.

By analyzing attributes of digital design assets independently of the digital design assets themselves, the asset management system enables content creators or other entities to more easily determine which attributes contribute to successful marketing campaigns. In particular, one or more embodiments of the asset management system aid content creators in selecting attributes for updating existing digital design assets or creating new digital design assets that are more likely to lead to successful marketing campaigns. Performance information (including comparative performance information) for individual attributes allows even inexperienced content creators to easily determine which attributes are most likely to lead to successful digital design assets in connection with one or more marketing campaigns or for different audience segments.

Furthermore, the asset management system is able to provide the performance information for digital design assets and the corresponding attributes across a plurality of content creation applications or platforms. Accordingly, the asset management system can provide useful performance information within a content creation application or platform. Providing such information within content creation applications can allow the content creators to quickly and easily access information for creating new digital design assets or updating existing digital design assets. For instance, content creators can access the performance information without launching a separate application or contacting marketing personnel to access the analytics data associated with previously used digital design assets. Accordingly, integrating the performance information across a plurality of content creation applications or platforms and making the information accessible via a remote network connection also reduces the resource load and data storage requirements on client devices of content creators by eliminating the need for multiple client applications for analyzing attribute performance while creating digital design assets.

As used herein, a "marketing campaign" refers to a set of one or more advertisements, web pages, or other digital marketing content sharing one or more common characteristics. Specifically, such common characteristics can include similar content (e.g., directed toward the same product, line of products, or brand), a similar theme (e.g., a particular sale, products for a particular season), or features directed toward a particular audience. For example, a marketing campaign can include one or more related advertisements that are each directed towards a single brand, product, or service. Alternatively, a marketing campaign can include advertisements that are directed towards different products or features of a line of products or services. For example, a marketer can configure a marketing campaign to include a plurality of advertisements for a single product or service. Additionally, in one or more embodiments, the marketing campaign can include different types of advertisements (e.g., videos, banners, pop-ups, audio clips) that relate to a particular product or service.

Also as used herein, "marketing content" or "electronic marketing content" refers to advertisements or other forms of digital data related to marketing that may be transmitted over a communication network. For example, marketing content can include, but is not limited to, digital media (e.g., audio, video, images), electronic documents, electronic messages, electronic advertisements, or any other digital data or combination of digital data. As an example, marketing content or advertising content can refer to a video advertisement provided to a user via a website. Other examples of marketing content or advertising content can refer to banners, overlays, pop-ups, emails, texts, audio clips, etc. Marketing content can include one or more digital design assets. For example, a particular email advertisement (e.g., an example of marketing content) can include a digital photo (an example of a digital design asset) along with other content such as hyperlinks, text, or additional digital design assets.

According to at least some implementations, the marketing content can include one or more digital design assets (or simply "assets"), as described in more detail below. As used herein, the term "digital design asset" or "design asset" refers to an individual content item that is used in a marketing campaign or otherwise. In particular, a digital design asset can include creative content that is designed to help advertise to and attract customers. For example, a digital design asset can include digital images, video files, audio files, or any combination thereof. To illustrate, a digital design asset can be a photograph, a computer generated graphic, a group of images, a video commercial, music, sound, and/or other such content.

Furthermore, each digital design asset includes one or more attributes that determine the visual design of the digital design asset. Specifically, as used herein, the terms "attribute" and "digital design asset attribute" refer to audio visual characteristics of a digital design asset. For example, an attribute of a digital design asset can include characteristics that define a visual component of the digital design asset within attribute categories such as, but not limited to, a background, color, color scheme, font, subject (e.g., object, person, idea), dimension, shape, content type (e.g., image, text, video), visual scheme, or layout of the digital design asset. Similarly, an attribute can include characteristics that define an audible component of the digital design asset such as, but not limited to, a sound type, music genre/type, audio feature (rhythm, tempo, pitch, etc.), or length of the digital design asset. As used herein, the term "attribute category" or "category of attribute" refers to a grouping of attributes that correspond to the same visual component. In particular, an attribute category includes groupings such as "background," "color," "color scheme," etc., such that individual attributes within an attribute category define specific variations of attributes of that category. As an example, within the attribute category of "color," an attribute can be "black," "white," "blue," etc.

As used herein, the terms "marketing medium" and "marketing media" refer to channels for delivering digital content to users in a marketing campaign. Marketing media can include, but are not limited to, websites, emails, mobile applications, social applications, and targeting recipes (e.g., a/b tests or targeted advertising experiences). Marketing content in a marketing campaign can include advertisements, branding content, content used as part of a customer experience with a commercial entity, or other content designed to attract or maintain a relationship with users.

FIG. 1 illustrates one embodiment of an environment 100 in which an asset management system 102 can operate. In one or more embodiments, the environment 100 includes server device(s) 104, an analytics server 106, and client devices 108, 110 communicating over a network 111. Although the environment 100 of FIG. 1 is depicted as having various components, the environment 100 may have any number of additional or alternative components (e.g., any number of server device(s) 104, analytics servers 106, or client devices 108, 110). For example, more than one component or entity in the environment 100 can implement the operations of the asset management system 102 described herein. To illustrate, the server device(s) 104 and the analytics server 106 may be part of the asset management system 102. Additionally, or alternatively, the server device(s) 104 can include the analytics server 106, or vice versa. Furthermore, the environment can include any number of client devices 108, associated with a corresponding number of users 109. Accordingly, the asset management system 102 can deliver marketing content to and analyze the effectiveness of the marketing content across a plurality of user devices and corresponding users.

In one or more embodiments, the asset management system 102 performs operations associated with managing marketing campaigns. In one or more embodiments, the asset management system 102 determines which marketing campaigns to use, when to use the marketing campaigns, and how to deliver marketing content associated with selected marketing campaigns. For example, the asset management system 102 can select a marketing campaign for delivering content to one or more users. Additionally, the asset management can select one or more marketing media (e.g., marketing medium 112) in connection with the selected marketing campaign for delivering content to the client device 108 of a user 109.

In one or more embodiments, the server device(s) 104 store, manage, and provide various types of content. Specifically, the server device(s) 104 can store and manage content (e.g., marketing content) to provide to the user 109 via a marketing medium 112 at the client device 108. For example, the server device(s) 104 can include servers that provide content to client device 108 over the network 111, which can include an Internet connection or other network connection. To illustrate, examples of server device(s) 104 include ad servers, media content servers, web servers, or other content servers that are able to provide marketing content to users by way of the marketing medium 112.

In one or more embodiments, the server device(s) 104 provide marketing content to users in connection with one or more other content providers (not shown). Specifically, the server device(s) 104 can provide marketing content in response to a request by a client device or a content provider to deliver the marketing content to one or more client devices, including client device 108. For example, when a content provider provides digital content (e.g., a live TV stream, webpage, or other content) to the client device 108, the digital content may include a space for advertisements. The client device 108 or the content provider can send a request for the advertisement to the server device(s) 104, and the server device(s) 104 can deliver the advertisement to the client device 108.

In one or more embodiments, the asset management system 102 includes an analytics server 106 to collect analytics data in connection with marketing content and marketing media (e.g., marketing medium 112). In particular, the analytics server 106 can communicate with the server device(s) 104 and client device 108 to collect usage and performance information associated with the marketing content. For example, the analytics server 106 can identify usage of a marketing content in a marketing campaign, and performance of the marketing content as measured by impressions and interactions with the marketing content at the client device 108. The asset management system 102 can provide the analytics data collected by the analytics server 106 with the marketing content on the server device(s) 104 for determining how to improve current or future marketing campaigns.

For example, the analytics server 106 can include an attribute tracker 107 for tracking usage of attributes in digital design assets. Specifically, the attribute tracker 107 can determine how often attributes are used based on the usage of digital design assets that include the attributes. Based on the usage of, and user interactions with, the digital design assets, the attribute tracker 107 determines a performance of a plurality of attributes. The attribute tracker 107 can provide analytics data to the client device 110 for the user 113 to view when creating or editing digital design assets.

Additionally, the client device 108 can include a computing device that allows the user 109 to access and/or store digital content for viewing on a display of the computing device or for interacting with the digital content at the computing device. For example, the client device 108 can include a smartphone, tablet, desktop computer, laptop computer, or other device that is able to receive digital content from the server device(s) 104 or other content providers via a network connection. The client device 108 may include one or more client applications that enable a user to receive and interact with marketing content from the server device(s) 104 via the marketing medium 112. The client device 108 may also include one or more display devices for displaying digital content. Furthermore, the client device 108 can include any of the devices or features discussed below in reference to FIG. 9.

In one or more embodiments, the asset management system 102 uses collected analytics data to provide the analytics data to one or more users involved with the analysis and creation of marketing content performance. For instance, the asset management system 102 can communicate with the client device 110 of a user 113 who is a content creator. In particular, the user 113 can create digital design assets using the client device 110 for using in marketing content for one or more marketing campaigns. As with client device 108, client device 110 can include any of the devices or features discussed below in reference to FIG. 9.

According to one or more embodiments, the asset management system 102 provides the analytics data to the user 113 in an asset creation application 114 that allows the user to update or create digital design assets. The asset creation application 114 can include a software application running on the client device 110 for creating image files, video files, and/or audio files to use in one or more advertisements. The user 113 can use the asset creation application 114 to update or create digital design assets including one or more attributes. Additionally, the user 113 can view the analytics data associated with the digital design assets and/or attributes to determine which digital design assets and/or attributes to include in updated/new digital design assets.

Figure 2:
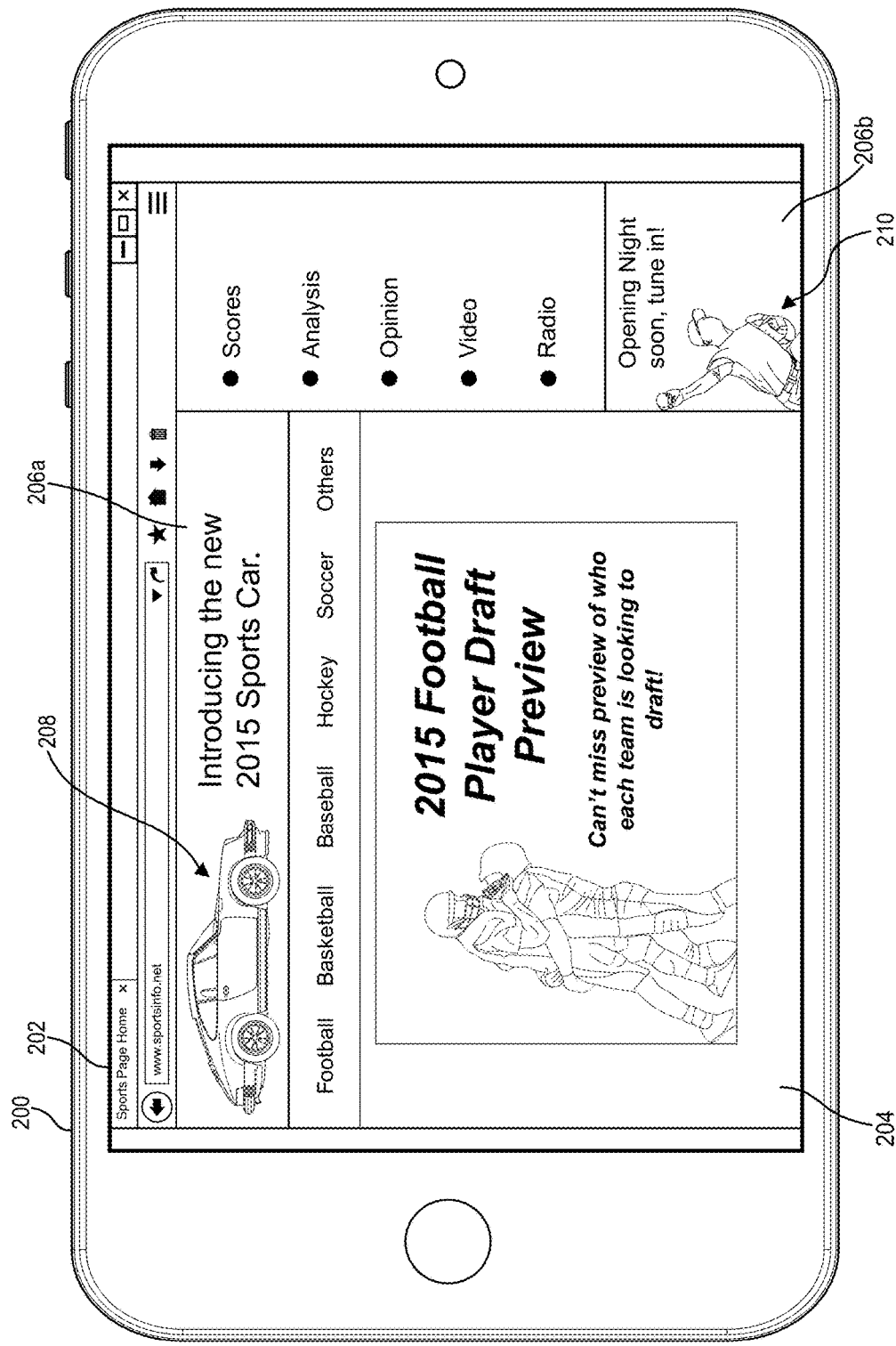
FIG. 2 illustrates a user interface displaying digital design assets in marketing campaigns in accordance with one or more embodiments.

As described previously, the asset management system 102 can provide, to one or more users, marketing content for a plurality of marketing campaigns via various marketing media on one or more client devices. FIG. 2 illustrates a user interface for displaying marketing campaigns on one or more client devices. Specifically, each marketing campaign can include one or more digital design assets delivered to one or more client devices via one or more marketing media. For example, FIG. 2 illustrates a client device 200 that displays a web browser 202 as an example of what may be displayed on a client device 108, such as a desktop computer or a tablet.

In one or more embodiments, the client device 200 displays content associated with a website 204 to which a user has navigated. For example, the client device 200 can display content that is part of the website 204, as well as one or more advertisements displayed in one or more designated areas of the web site 204. To illustrate, the web browser 202 of FIG. 2 illustrates a website 204 that contains content about sports and a first area 206a and a second area 206b designated for advertisements or other marketing content associated with one or more marketing campaigns. Although FIG. 2 illustrates a website 204 with specific content and a specific number of areas designated for marketing content, the web site 204 may contain any type and amount of content, as well as other numbers or types of areas for marketing content. For example, the website 204 may include a video interface for streaming video content, as well as for providing video marketing content within the same video interface.

In one or more embodiments, when a user attempts to access the website content, the client device 200 can communicate with a web server or other content provider to obtain the website content to display within the web browser 202 of the client device 200. The web server can provide the content of the website 204 to the client device 200 via a network connection. When the client device 200 receives the content from the web server, the client device 200 can render the content according to a layout determined by the web server or by a website owner.

Additionally, in one or more embodiments, the client device 200 can determine that the website 204 contains areas for marketing content. In response to a determination that the website 204 contains areas for marketing content, the client device 200 (or the web server) can communicate with the asset management system to obtain marketing content associated with one or more marketing campaigns selected by the asset management system. The asset management can then provide one or more digital design assets associated with the selected marketing campaign(s) for presentation within the website 204 at the areas designated for marketing content. In at least some implementations, the marketing content can include a banner ad (e.g., the first area 206a), an ad in a navigation bar of the website 204 (e.g., the second area 206b), or even as part of the website content (e.g., a background image or digital design assets that the content creator generated for use with a website 204 of the content provider or advertiser).

To illustrate, FIG. 2 includes a first digital design asset 208 as part of the banner ad on the website 204, and a second digital design asset 210 as part of the navigation bar ad on the website 204. The illustrated digital design assets 206, 208 are part of separate marketing campaigns, though the digital design assets 206, 208 may be part of the same marketing campaign. Additionally, the first digital design asset 208 and the second digital design asset 210 each include or are associated with a unique asset identifier that allows the asset management system to distinguish the first digital design asset 208 and the second digital design asset 210 from each other, as well as from other digital design assets that may be used in the website 204.

Furthermore, the first digital design asset 208 and the second digital design asset 210 each include one or more attributes defining audiovisual characteristics of the assets. For example, the first digital design asset 208 can include at least a first attribute, and the second digital design asset 210 can include at least a second attribute. To illustrate, the first attribute of the first digital design asset 208 can include a first subject (e.g., car product), and the second attribute of the second digital design asset 210 can include a second subject (e.g., a baseball game) that is different than the first font type. In another example, the first digital design asset 208 can include a background attribute (e.g., background color, background subject) that defines a first background, and the second digital design asset 210 can include a background attribute that defines a second background that is different than the first background. In one or more embodiments, marketing content in different marketing campaigns uses different attributes based on the purpose of the marketing campaigns or for distinguishing between the marketing campaigns.

Although the first digital design asset 208 and the second digital design asset 210 of FIG. 2 are described as having different attributes, the assets 208, 210 can also share one or more attributes. For instance, the first digital design asset 208 and the second digital design asset 210 can both include a color attribute defining a common color or color scheme. As can be appreciated, similar attributes across a plurality of digital design assets can indicate that the digital design assets are part of the same marketing campaign. To illustrate, a marketing campaign can include a plurality of digital design assets for providing a plurality of different advertisements about a single product, such as different images of a car for a marketing campaign about the car.

Additionally, digital design assets can include attributes based on certain audience segments for which each asset is intended. As used herein, the terms "audience segment" and "target audience segment" refer to a group of users that marketing content is targeting. For example, the asset management system can customize marketing content to appeal to users of specific demographics, interests, or other groupings of users. To illustrate, the system can target marketing content to a first audience segment by customizing the first digital design asset 208 to include one or more attributes that appeal to the first audience segment. Similarly, the system can target marketing content to a second audience segment by customizing the second digital design asset 210 to include one or more attributes that appeal to the second audience segment. Alternatively, the system can target the assets 208, 210 to include similar attributes for targeting the corresponding marketing content to the same audience segment.

In one or more embodiments, a marketing campaign includes marketing content using different digital design assets for targeting marketing content to a plurality of different audience segments based on attributes of the digital design assets. Specifically, the asset management system can select marketing content to include in an ad served to the client device 200 based on one or more audience segments to which a user of the client device 200 belongs. To illustrate, the asset management system can determine that the user belongs to an audience segment that is interested in sports and select ads that appeal to users who are interested in sports. For example, when selecting or creating an ad for a specific audience segment, the asset management system can select or create the ad using digital design assets with attributes that tend to perform well with the specific audience segment. Similarly, the asset management system can determine that the user likely belongs to an audience segment associated with a certain age range and select or create ads accordingly.

In one example, when selecting an ad for displaying within the website 204, the asset management system determines the audience segment for a user and selects a digital design asset based on the determined audience segment. Specifically, the asset management system can identify digital design assets that have previously performed well for the determine audience segment and then select an ad that includes one or more digital design assets with similar attributes to the identified digital design assets. For instance, the asset management system can determine that the user belongs to a first audience segment and select marketing content that uses the first digital design asset 208 based on the attributes of the first digital design asset 208. Alternatively, the asset management system can determine that the user belongs to a second audience segment and select marketing content that uses the second digital design asset 210 based on the attributes of the second digital design asset 210.

As with the different digital design assets in one or more campaigns, the asset management system can assign unique attribute identifiers to the attributes used in digital design assets. Specifically, unique attribute identifiers assigned to the different attributes allow the asset management system to distinguish different attributes from one another, whether the attributes are used in a single digital design asset or in multiple digital design assets. For example, the unique attribute identifiers can allow the asset management system to distinguish a first subject attribute from a second subject attribute in one or more digital design assets.

In one or more embodiments, the asset management system collects analytics associated with the marketing campaign simultaneously or substantially simultaneously at the time of using the marketing campaign at the client device 200. Specifically, the asset management system can perform a request to verify that the marketing content has been used at the client device 200, and identify the campaign identifier for the marketing content. For example, the asset management can perform a first request to identify the campaign identifier and collect analytics data that describes that an advertisement in the marketing campaign was displayed at the client device 200. Alternatively, the client device 200 can communicate information to the asset management system automatically (e.g., in response to loading and displaying content in the marketing medium) without an explicit request from the asset management system. Additionally, the asset management system can identify the marketing medium used to deliver the advertisement (e.g., website content, as in FIG. 2).

According to one or more embodiments, the asset management system collects analytics associated with the digital design assets used in connection with the marketing content in a subsequent request to the client device 200. In particular, the asset management system can perform a second request after identifying the campaign identifier to determine that the asset management system delivered one or more digital design assets to the client device 200 to be included in an advertisement of the marketing campaign. For example, the asset management system can perform a second request separate from the first request to identify one or more asset identifiers of assets provided to, and displayed in, the website 204, such as when the client device 200 loads and displays the digital design asset. Thus, the asset management system can identify the one or more digital design assets separately from the marketing campaign.

Based on the collected analytics for the digital design assets, the asset management system can determine various analytics associated with attributes of the digital design assets. Specifically, the asset management system can identify specific digital design assets provided to the client device 200 using the asset identifiers corresponding to the provided digital design assets. Additionally, each of the digital design assets can be associated with one or more attributes with corresponding attribute identifiers. Accordingly, to determine a performance of a specific attribute, the asset management system can determine the performance of each of the digital design assets including the attribute (i.e., based on the digital design asset being associated with the attribute identifier) and associate the performance of the digital design assets to the attribute.

For example, a response by the client device 200 to the second request can include asset identifiers for the digital design assets provided to the client device 200. In response to receiving the asset identifiers from the client device 200, the asset management system can look up attribute identifiers for the attributes in the digital design assets. For instance, the asset management system can look up the attribute identifiers in a lookup table that has asset identifiers mapped to attribute identifiers for attributes in the various digital design assets. Alternatively, the asset management system can identify the asset identifiers based on metadata included in information provided to the asset management system from the client device 200. Because the attribute identifiers are different than the asset identifiers and the campaign identifier, the asset management system can distinguish and track the attributes of the digital design assets independently from the digital design assets and the marketing campaign.

For example, the asset management system can receive a first asset identifier for a first digital design asset including a first set of attributes. The asset management can also receive a second asset identifier for a second digital design asset including a second set of attributes. Each of the attributes in the first set of attributes and the second set of attributes is associated with a unique attribute identifier. Analytics data collected for the first digital design asset is associated with the attributes in the first set of attributes, and analytics data collected for the second digital design asset is associated with the attributes in the second set of attributes. If the first set of attributes and the second set of attributes include a common attribute (i.e., the common attribute is in the first digital design asset and the second digital design asset), the asset management system associates analytics data corresponding to the first set of attributes and the second set of attributes to the common attribute. To illustrate, the asset management system determines a total number of impressions for the common attribute based on the impressions for the first digital design asset and the second digital design asset.

Alternatively, the asset management system can identify the campaign identifier, the asset identifier(s), and the attribute identifier(s) in the same request. More particularly, a web page including digital design assets can include a JavaScript tag that identifies which digital design assets were loaded on the web page. The JavaScript tag can identify which digital design assets are associated with the asset management system and send back a list of the asset IDs to the asset management system. The JavaScript tag can also identify which attributes are associated with the identified digital design assets and then send back a list of attribute IDs to the asset management system.

Additionally, the asset management system can identify the marketing medium in connection with the delivered marketing content. Specifically, the asset management system can identify a source identifier that corresponds to the specific marketing medium by which the asset management system has delivered a digital design asset to the client device 200. For example, the asset management system can identify a source identifier that describes that the marketing medium is a type of medium and/or the specific medium itself. To illustrate, the asset management system can detect a source identifier from the client device 200 to identify that the marketing medium is a website and/or that the website is a specific website. Thus, the asset management system can determine with which marketing campaigns and marketing media a digital design asset and its attributes have been used, and where the digital design asset and its attributes have been used.

In one or more embodiments, the asset management system can identify more than one digital design asset with their corresponding attributes displayed in the same marketing medium at the client device 200. For example, as illustrated in FIG. 2, the asset management system can determine that the website 204 contains a first digital design asset 208 displayed as a banner ad, and a second digital design asset 210 displayed in a navigation bar of the website 204. The asset management system can identify each digital design asset based on the corresponding asset identifiers and each attribute used in the identified digital design assets based on the corresponding attribute identifiers. For example, the asset management system can request any asset identifiers in the webpage in the second request to the client device 200. Based on the received asset identifiers, or included with the requested asset identifiers, the asset management system can identify the corresponding attribute identifiers of separate digital design assets.

Additionally, the asset management system can determine to which marketing campaigns each digital design asset and its corresponding attribute(s) belong based on the identified campaign identifier(s). Specifically, the asset management system can also identify a plurality of campaign identifiers in the first request to the client device 200 prior to obtaining the asset identifiers. When requesting the asset identifiers from the client device 200, the asset management system can determine that the first digital design asset (and its corresponding attribute(s)) corresponds to a first marketing campaign, and the second digital design asset (and its corresponding attribute(s)) corresponds to a second marketing campaign based on the campaign identifiers and the corresponding asset identifiers. Alternatively, the asset management system can determine that the one or more digital design assets (and their corresponding attributes) are part of the same marketing campaign based on the corresponding campaign identifiers and asset identifiers. The asset management system can thus determine a performance of the attributes across a plurality of marketing campaigns based on the performance of the corresponding digital design assets across the plurality of marketing campaigns.

As mentioned, identifying the marketing campaigns and corresponding digital design assets and attributes to be used in connection with the marketing medium to provide marketing content to the client device 200 can allow the asset management system to collect analytics data for the marketing campaigns, digital design assets, and attributes. For example, the asset management system can collect usage data for the marketing campaigns, the assets, and the attributes to determine how many times the marketing campaigns, assets, and attributes have been used. In particular, the asset management system can track the number of impressions (e.g., if the advertisement is fetched and/or displayed) associated with each marketing campaign/asset/attribute. To illustrate, after fetching a digital design asset and displaying the digital design asset on the website 204, the asset management system can count the instance of the asset provided to the client device 200 as an impression. The usage data can also include information that identifies the names and numbers of the marketing campaigns that include the asset.

Similarly, the asset management system can track the number of impressions associated with attribute(s) of a digital design asset with the impressions of the digital design asset and marketing campaign. For instance, because an attribute includes its own attribute identifier, the asset management system can count an instance of an asset including the attribute as an impression for the attribute. As such, the asset management system can track the usage data for the and attributes across multiple campaigns and digital design assets. To illustrate, if a first digital design asset and a second digital design asset include a common attribute, the asset management system collects analytics data for the common attribute in connection with both the first digital design asset and the second digital design asset.

Additionally, one or more embodiments of the asset management system collect performance data for the marketing campaigns, the assets, and the attributes to determine numbers and types of interactions with the marketing campaigns and the assets. Specifically, the asset management system can determine whether one or more users interact with a marketing campaign or a digital design asset at the client device 200 via the marketing medium. For example, the performance data for an attribute can include data associated with user clicks on corresponding digital design assets, unique users to view the digital design assets, conversions of users to customers, as well as targeting segments (e.g., user demographic information). The performance data can also include a performance score that the asset management system calculates for the campaigns, digital design assets, and the attributes to indicate the performance of the campaigns/assets/attributes relative to other campaigns/assets/attributes. Alternatively, the performance data for a specific attribute can include a direct number comparison of impressions, clicks, usage, etc., to other similar attributes. In one or more embodiments, the asset management system assigns each audience segment a unique segment identifier and includes the segment identifier with the campaigns, digital design assets, and/or attributes to allow for individual tracking of the segments.

In one or more embodiments, when a user interacts with marketing content, the client device 200 performs an operation to redirect the user to another webpage or website. For example, if the user clicks on marketing content displayed in the web browser 202 at the client device 200, the system can cause the client device 200 of the user to redirect the web browser 202 to a website corresponding to the marketing campaign that includes the corresponding asset. To illustrate, clicking on an advertisement (e.g., the car advertisement) can cause the client device 200 of the user to redirect the web browser 202 to a website of the advertiser (e.g., a webpage containing information about the car).

Additionally, the asset management system can collect performance data in connection with a user interaction with an asset, and consequently, the corresponding attribute(s) and marketing campaign. In particular, when the user interacts with marketing content including a digital design asset, the asset management system can detect the asset identifier for the digital design asset in a request from the client device 200 to the asset management system to fetch the webpage corresponding to the marketing campaign. Based on the detected asset identifier, the asset management system determines the attribute identifier(s) for the attribute(s) that correspond to the digital design asset. Similarly, the asset management system can also detect the campaign identifier for the marketing campaign that corresponds to the selected digital design asset. Alternatively, the asset management system can identify the marketing campaign and the digital design asset in separate requests or communications with the client device 200 associated with the user interaction. The asset management system can then increment a value corresponding to the number of clicks for the asset, the attribute(s), and/or the marketing campaign in an asset repository.

In one or more embodiments, if a user interaction with a digital design asset results in a conversion, the asset management system stores the corresponding analytics data with the asset and its attributes at the asset repository. Specifically, the asset management system can also track the user and conversions performed by the user by way of a device identifier or a user identifier. If the user purchases goods or services as a result of the interaction with the digital design asset, the asset management system can determine that the purchase corresponded to the interaction based on the device identifier or user identifier associated with the user interaction.

When tracking usage and performance of marketing campaigns, digital design assets, and corresponding attribute(s), the asset management system can use any suitable method for identifying the campaign identifiers, asset identifiers, and attribute identifiers in the various marketing media. For example, when tracking campaigns and assets in a webpage, the asset management system can identify a campaign identifier, an asset identifier, and one or more attribute identifiers using JavaScript protocols. To illustrate, the asset management system can identify the campaign identifier, the asset identifier, and attribute identifiers(s) using page tagging methods to detect JavaScript code or tags embedded in the webpage corresponding to the campaign identifier, the asset identifier, and attribute identifier(s).

Additionally, or alternatively, the asset management system can use other methods of detecting the identifiers, such as log processing. Specifically, a content delivery network or an edge network that serves content to client devices may include log files that store a record of file requests by the client devices. By analyzing the log files, the asset management system may be able to determine which digital design assets were provided to the client device in a particular webpage, as well as any attributes of the assets. The asset management system may use some combination of page tagging or log processing to identify usage and performance of the marketing campaigns, digital design assets, and attributes.

The asset management system can also associate the various identifiers with the analytics data in a database. For instance, the asset management system can maintain one or more tables of identifiers and collected analytics data for marketing campaigns by storing the analytics data in cells related to the identifiers. Additionally, the asset management system can associate one or more identifiers with each other by mapping identifiers within the database. To illustrate, the asset management system can associate a digital design asset with its attribute(s) and one or more marketing campaigns by mapping the corresponding asset identifier, attribute identifier(s), and campaign identifier(s).

Figure 3:
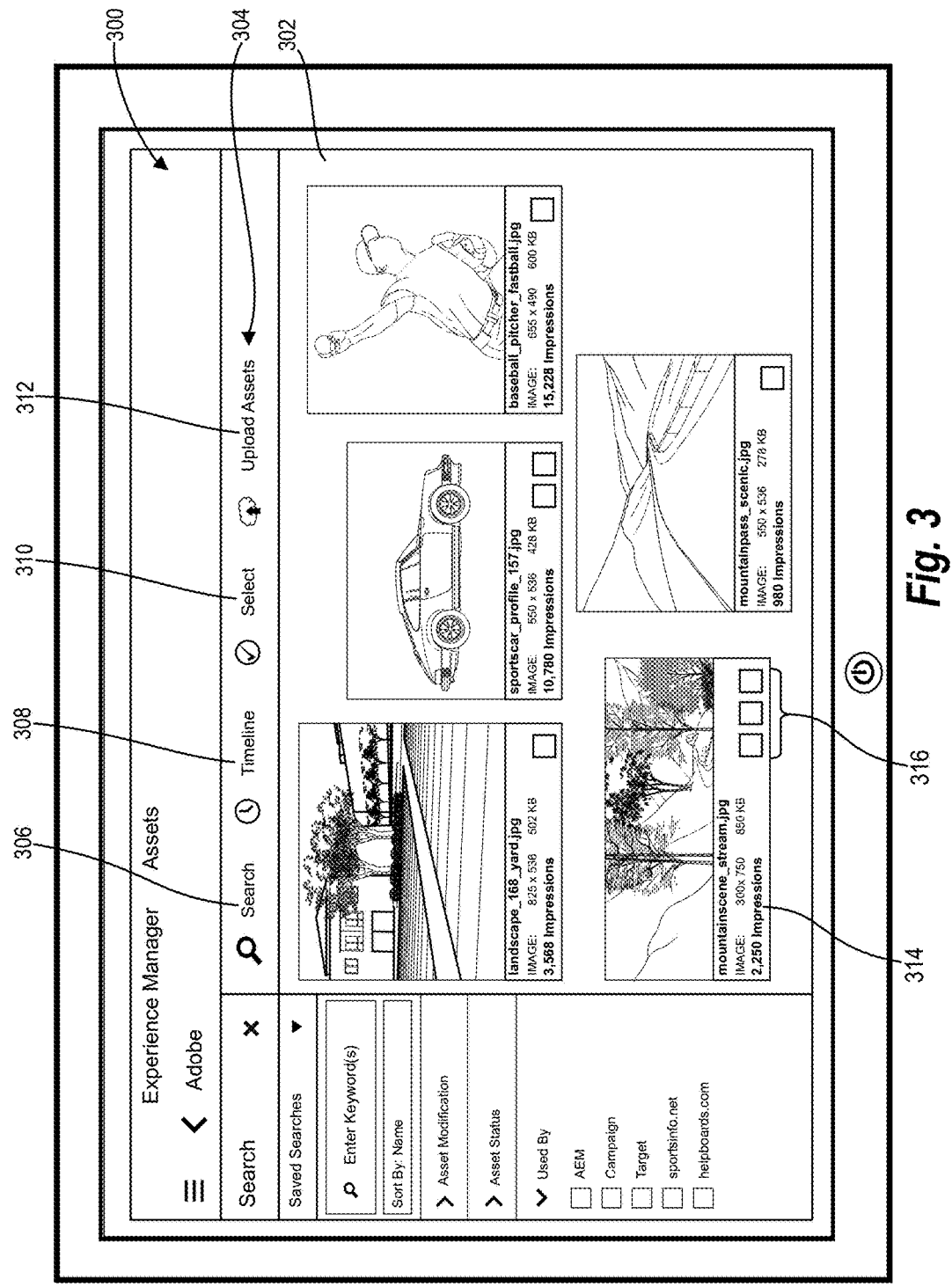
FIG. 3 illustrates a user interface for managing digital design assets in accordance with one or more embodiments.
Figure 4:
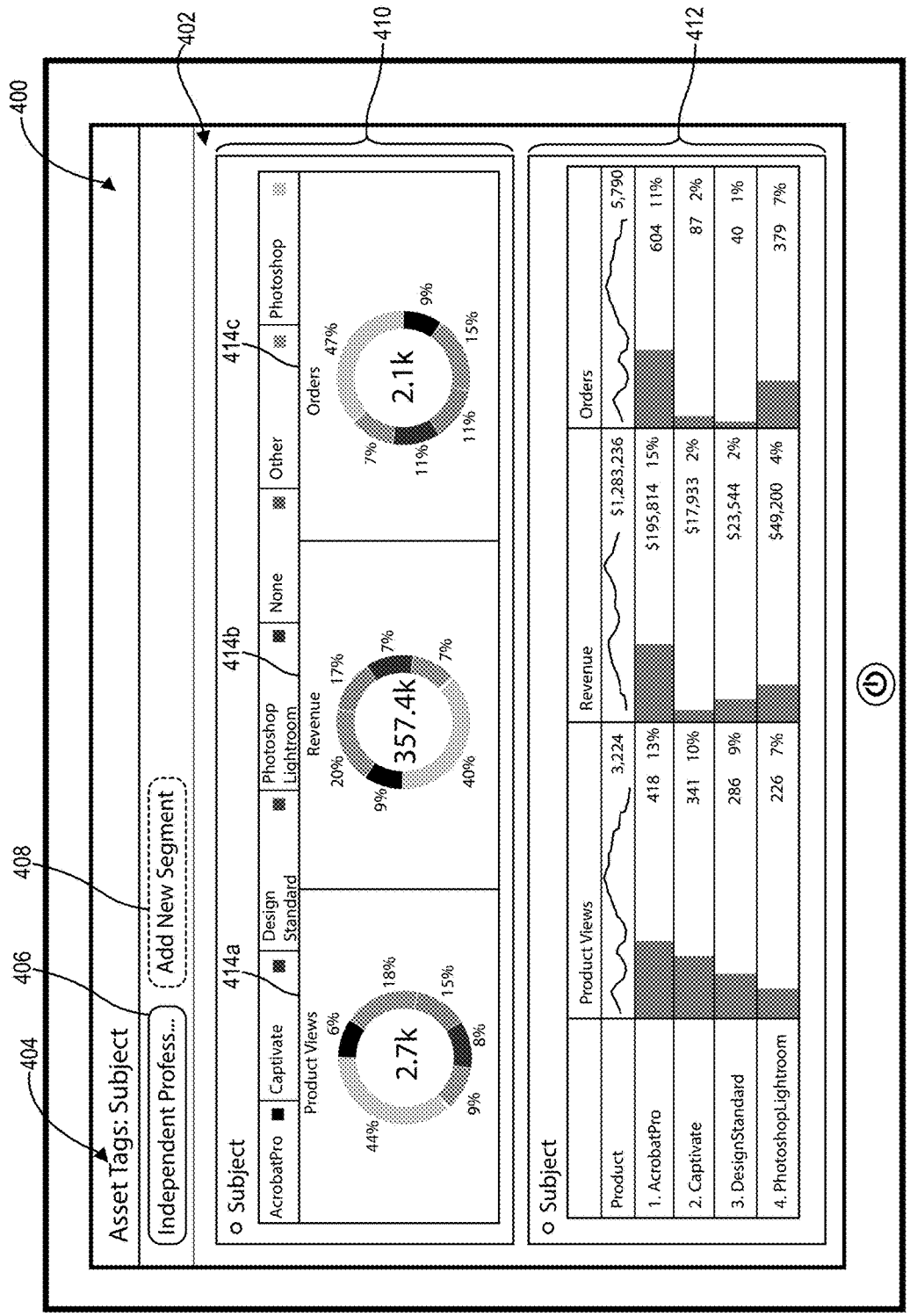
FIG. 4 illustrates a user interface for managing analytics data in accordance with one or more embodiments.

Although FIG. 2 illustrates an embodiment of digital design assets with specific attributes in a specific marketing medium and on a specific device, the asset management system can manage and provide marketing content to a variety of client devices for display within a variety of marketing media. Additionally, the asset management system can track usage and performance of attributes used in a plurality of digital design assets provided to various client devices and via various marketing media. The asset management system can also provide asset management and analytics data associated with attributes of digital design assets maintained in an asset repository. FIGS. 3 and 4 illustrate example user interfaces for managing digital design assets and viewing analytics data for usage and performance of assets and attributes. Specifically, the illustrated user interfaces allow one or more users involved with marketing, asset creation, and/or other positions associated with the creation and provision of marketing content to view, modify, and/or otherwise manage assets and attribute-specific analytics data associated with marketing content.

FIG. 3 illustrates an example user interface for the asset management application 300. In one or more embodiments, the asset management application 300 includes an asset section 302 to display assets that have been used in marketing campaigns or that are available for use in marketing campaigns. The asset management application 300 further includes a toolbar 304 for viewing and interacting with digital design assets in an asset repository. For example, the toolbar 304 can include, but is not limited to, a search tool 306, a timeline tool 308, a select tool 310, and an upload tool 312.

In one or more embodiments, the search tool 306 allows a user to search for a specific digital design asset or group of digital design assets in the asset repository. For example, the search tool 306 can allow the user to search by keyword, name, category, status, modification, or other characteristics to allow a user to more easily find a desired digital design asset or group of digital design assets. The search tool 306 may also allow the user to search for digital design assets based on one or more attributes that the asset management system tracks with digital design assets, as described herein. To illustrate, a user can use the search tool 306 to search for an attribute (e.g., a specific font) included in one or more digital design assets of the asset repository. Using the search tool 306 can cause the asset management application 300 to display results of a search for one or more digital design assets or one or more attributes according to the search criteria. Additionally, the search tool 306 can allow a user to search for attributes used in specific marketing campaigns, for specific audience segments, or in specific marketing platforms (e.g., attributes used at a particular website, in a particular application, or with a particular delivery method).

In one or more embodiments, the timeline tool 308 provides information about when a digital design asset was last used and/or created or when an attribute was last used in a digital design asset. For example, selecting the timeline tool 308 can allow a user to change how the results are displayed within the asset management application 300. To illustrate, selecting to display digital design assets that include a specific attribute based on creation date of the digital design assets can cause the asset management application 300 to display the digital design assets in the repository in an order corresponding to the creation date of each digital design asset. Alternatively, the timeline tool 308 can cause the asset management application 300 to display assets based on when digital design assets including the specific attribute were last used in a marketing campaign.

According to one or more embodiments, the asset management application 300 includes a select tool 310 to select one or more digital design assets or attributes for viewing the assets/attributes. Specifically, the select tool 310 can allow a user to select a specific asset or group of assets for viewing the analytics data for the selected asset(s). Additionally, the select tool 310 and/or another tool can allow the user to view information about one or more attributes of a specific asset or group of assets, including the analytics data corresponding to the attributes, as described in more detail with reference to FIG. 4. The select tool 310 may allow a user to select a specific digital design asset or group of digital design assets for deleting or modifying the asset. For example, a content creator can modify digital design assets (e.g., by modifying one or more attributes of the digital design assets) after storing the digital design assets in the asset repository.

The upload tool 312 can allow a content creator or entity to upload new content to the asset repository. For example, when a content creator has finished generating a new digital design asset, as described in more detail below with reference to FIGS. 5A-5C, a user can select to upload the digital design asset to the asset repository. Additionally, uploading a new digital design asset can cause the asset management application 300 to rearrange visible digital design assets based on display criteria for the asset repository. To illustrate, if a user has performed a search for a specific attribute included in a new digital design asset, the asset management application 300 can update the displayed digital design assets to include the new digital design asset. In one or more embodiments, uploading a new digital design asset to the asset repository via the asset management application 300 can cause the asset management system to assign a new asset identifier to the digital design asset and attribute identifier(s) to attribute(s) used in the digital design asset, or to identify an already embedded asset identifier for the digital design asset and already identified attribute identifier(s) for the attribute(s).

In one or more embodiments, the asset management application 300 displays analytics data 314 for each of the digital design assets. Specifically, the asset management application 300 displays one or more data points from a plurality of data points that provide a brief synopsis of how well the digital design assets are performing. For example, as shown by FIG. 3, the asset management application 300 displays analytics data 314 including, but not limited to, a name or filename of each asset, file specifications (e.g., image dimensions, file size, or audio/video length) a total number of impressions for each digital design asset across a plurality of marketing campaigns. In alternative embodiments, the asset management application 300 displays any of the analytics data collected for the digital design assets or allows a user to selectively configure which data is shown. The asset management application 300 can also provide a summary of identified attributes of each digital design asset.

In one or more embodiments, the asset management application 300 also displays which marketing campaigns or marketing media have used each asset. To illustrate, the asset management application 300 can display icons 316 representing each marketing medium that has used a particular digital design asset. For example, the icons 316 can indicate that a particular digital design asset was used in social application, on a web page, in an email campaign, or other marketing medium or type of campaign. Thus, the icons 316 can comprise an icon for each of a plurality of different uses for digital design assets. Each time a digital design asset is used in a particular manner, the asset management system can add and display the associated icon with the digital design asset. Similarly, the asset management application 300 can provide information indicating which marketing campaigns or marketing media have used assets including specific attributes.

One will appreciate that the asset management application 300 can allow users/marketers to browse and select digital design assets. More particularly, the asset management application 300 can aggregate all of the digital design assets of an organization and the track and provide analytics data for each of the digital design assets. Furthermore, the asset management application 300 can allow users to filter the digital design assets based on the tracked analytic data. For example, the asset management application 300 can allow a user to filter digital design assets based on the marketing campaigns or marketing media in which they have been used, the impressions, click-thru-rates, likes, revenue, conversions, shares, or any other of the tracked data for the digital design assets. One will appreciate that for organizations that have large numbers of digital design assets, the ability to sort and find effective digital design assets based on prior use and effectiveness is a powerful tool. As an example, the asset management application 300 allows users to sort digital design assets by click rate in order to see which digital design assets are providing the best click rates at a given time. Furthermore, the asset management application 300 can allow a marketer to find a digital design asset that has been performing well for a certain area. For example, the asset management application 300 can allow the marketer to find digital design assets that have been performing well for males within the ages of 25 and 30. Thus, the asset management application 300 allow user not only to find out which digital design assets are performing, but then to be able to find digital design assets that will likely be successful in a given marketing campaign or for a given targeted segment of users.

In one or more embodiments, the asset management system allows a user to view additional, or more granular, analytics data for a digital design asset. For instance, the asset management application 300 also allows users to view detailed analytics reports for individual assets by selecting one or more assets in the asset section 302. For example, selecting one or more assets in the asset section 302 can cause the asset management application 300 to display detailed analytics data collected for the selected asset(s), including usage and performance information related to the selected asset(s).

While the above description relates to filtering digital design assets based on tracked analytic data, the asset management application 300 can also allow a user to filter digital design assets based on tracked analytic data for the attributes. To illustrate, the asset management application 300 can allow a user to filter the digital design assets according to impressions, click-thru-rates, likes, revenue, conversions, shares, or any of the other tracked data for attributes included in the digital design assets. Thus, the asset management application 300 can provide users with a number of tools for finding digital design assets and determining reasons for performance of digital design assets.

Additionally, users can view various detailed analytics reports detailing the usage and/or performance of attributes of digital design assets across one or more marketing campaigns and/or audience segments. FIG. 4 illustrates a user interface of an analytics application 400 that provides analytics data about attributes used in digital design assets. According to one or more embodiments, the analytics application 400 is part of the asset management application 300 (e.g., a GUI provided within the asset management application 300). Alternatively, the analytics application 400 can be separate from the asset management application 300.

As mentioned, the analytics application 400 can provide usage and performance data for attributes of digital design assets used in one or more marketing campaigns. A detailed report 402 for a selected attribute type 404 can include usage data, performance data, and at least some analytics pertaining to demographics of users who have seen and/or interacted with attributes of the attribute type 404. Specifically, the detailed report 402 can include, but is not limited to, number of impressions, click rate, conversions, unique visitors that have viewed marketing content related to attributes of the attribute type 404, campaigns that have used attributes of the attribute type 404, trends in usage/performance, comments associated with attributes of the attribute type 404, and information about audience segments of various demographics (e.g., age, gender, socioeconomic status, education). A detailed analytics report 402 can provide an improved understanding of the usage and performance of a particular attribute.

In particular, FIG. 4 illustrates that the attribute type 404 (also referred to as an "asset tag") corresponds to subjects of marketing content. As previously mentioned, a subject attribute can indicate a subject of marketing content, such as a product corresponding to the marketing campaign for which the asset management system provides marketing content. For example, FIG. 4 illustrates that an attribute type classified as a subject can be associated with a plurality of different attributes (e.g., software products). Alternatively, the attribute type 404 can include a different attribute type, or a plurality of attribute types for which the user can view analytics data.

Additionally, the analytics application 400 allows a user to select an audience segment 406 for generating the detailed analytics report 402. Specifically, the user can select one or more audience segments, indicated by an audience segment element 406, for tailoring the detailed analytics report to include analytics data corresponding to the usage and performance of attributes of the attribute type 404 relative the selected audience segment. To illustrate, the user can select an audience segment (e.g., "Independent Professionals") that defines a group of users to which the asset management system provided one or more digital design assets in one or more marketing campaigns. Thus, the detailed analytics report 402 can display analytics data for the usage and performance of various attributes (e.g., subjects) associated with the digital design assets. The user can select additional audience segments using an add segment element 408 to further expand the detailed analytics report 402 to include usage and performance of the attributes relative to the additional audience segments.

In one or more embodiments, the analytics application 400 provides a plurality of sections for viewing the analytics data of attributes of the selected attribute type 404 relative to the selected audience segment(s). For instance, the analytics application 400 can include a variety of different methods of viewing the analytics data. To illustrate, the detailed analytics report 402 of FIG. 4 includes a first section 410 that includes a chart view of analytics data. Additionally, the detailed analytics report 402 also includes a second section 412 that includes a list view of the attributes within the selected attribute type, along with the corresponding analytics data.

Although FIG. 4 illustrates a plurality of different views of analytics data according to a plurality of metrics, the analytics application 400 can allow a user to customize the display of analytics data by selecting one or more views to display and/or one or more metrics for the attribute. For example, the user can select a single view for including in the detailed analytics report 402. Alternatively, the user can select one or more other views for including in the analytics report 402. Thus, the user can customize the detailed analytics report 402 according to the user's preferences and/or needs.

As shown, the first section 410 can include marketing data from the analytics data in a graph view. In particular, the first section 410 can include marketing data displayed within the chart view in connection with the selected attribute type 404. For example, the first section 410 can include a plurality of descriptors of the various subjects of digital design assets used in one or more marketing campaigns. As illustrated, the subjects include various software products. Alternatively, the subjects can include any subject of a marketing campaign, including goods, services, people, or any other subject for which the asset management system can create digital design assets.

Additionally, the first section 410 can include a plurality of metrics 414a-c for which the asset management system has collected analytics data. Specifically, the plurality of metrics 414a-c include metrics that indicate the usage and/or performances of the attribute 404 for the selected audience segment(s). To illustrate, the asset management system can collect analytics data including, but not limited to, product views, revenue, orders, clicks (or similar user interaction), unique visitors visits, units, performance score and/or other data that indicates the usage or performance of the attribute 404 for the audience segment(s). The detailed analytics report 402 can then display one or more of the metrics for which the system collected analytics.

The chart view can provide a visual comparison of the different subjects (or other attribute types corresponding to the attribute 404. In particular, the chart view can provide comparison data that allows a user to view the usage and performance of one or more attributes of a selected attribute type relative to each other or to a performance scale. Additionally, the chart view can provide numerical values of the analytics data for the various attribute types for the selected segment for quick and easy interpretation of the analytics data.

As mentioned, the second section 412 can include a list view of the analytics data for the attribute 404 and in connection with the selected audience segment. In one or more embodiments, the list view displays additional information in a list format, including information from the chart view or other categories of information. For example, the list view can include analytics data to allow a user to quickly compare and view the best performing attributes. Alternatively, the list view can display additional information, such as trend information indicating one or more trends of the usage/performances of the attributes and/or overall usage/ performance of attributes within a selected attribute category. Similarly, the list view can include the analytics data in a ranked list of attributes (e.g., in a table) for simple determination of the top performing attributes. To illustrate, the asset management system can rank the attributes based on performance (e.g., performance scores) and then present the attributes with the best performance at the top of the ranked list in the list view.

Because the detailed analytics report is customizable, the analytics application 400 can allow a user to reconfigure the order and/or the content of information displayed. For example, the user can select one or more of the sections to move, hide, delete, and/or modify. Thus, the user can rearrange one or more sections, change the metrics displayed in one or more of the sections, remove one or more of the sections, add one or more new sections, and/or otherwise interact with the sections within the analytics application 400. Thus, different users can tailor the detailed analytics report to suit the needs of each individual user.

In addition to providing the analytics data in an asset repository for access by an advertiser or marketer, the asset management system can aid in creating new digital design assets or for updating existing digital design assets. Specifically, the asset management system can aid content creators in improving new or existing marketing campaigns. In one or more embodiments, the asset management system identifies characteristics of successful digital design assets and specific attributes to provide to content creators for the content creators to use in determining how to design updated or new digital design assets.

Figure 5A:
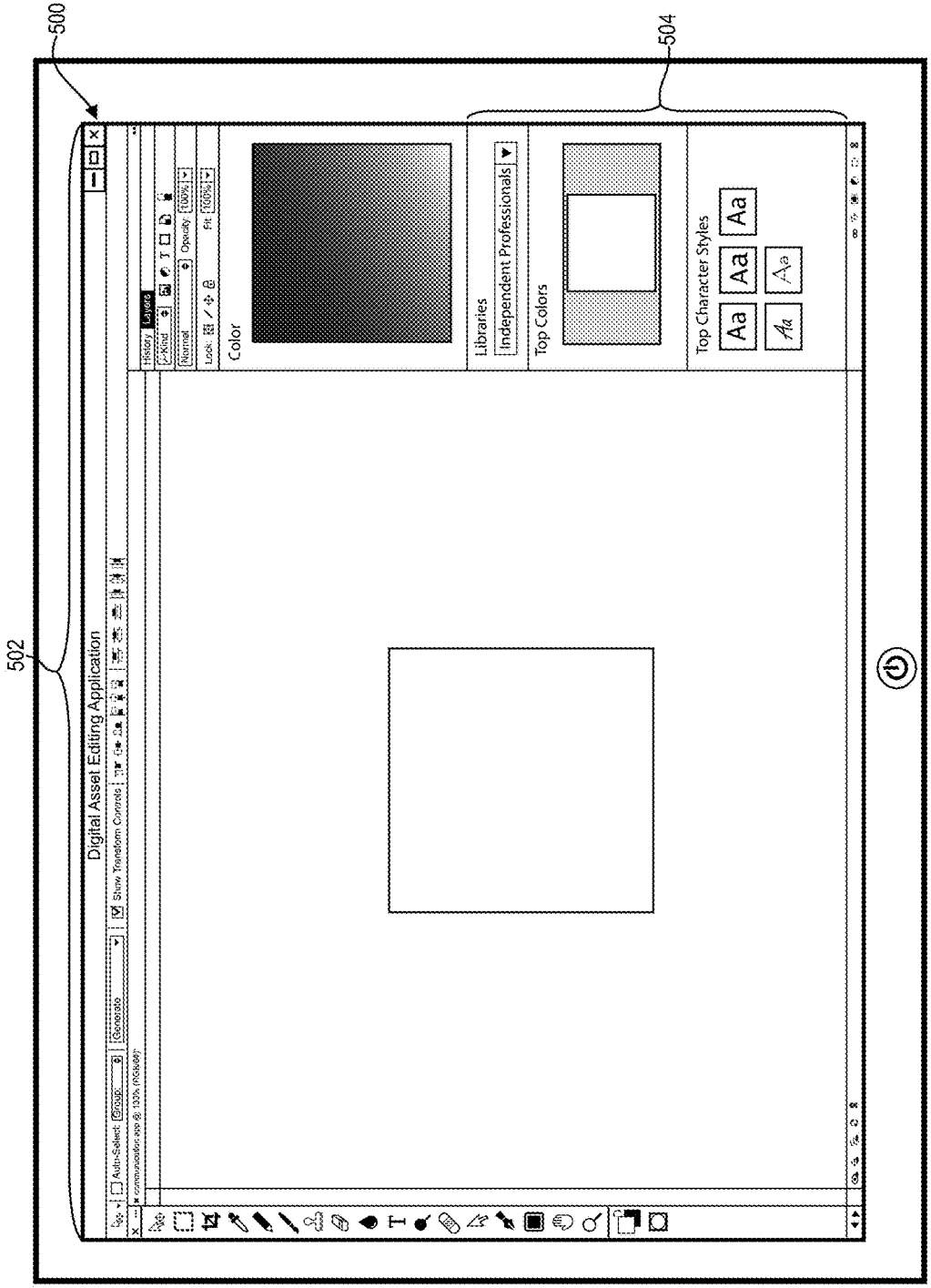
FIGS. 5A-5C illustrate user interfaces for creating digital design assets using analytics data in accordance with one or more embodiments.
Figure 5B:
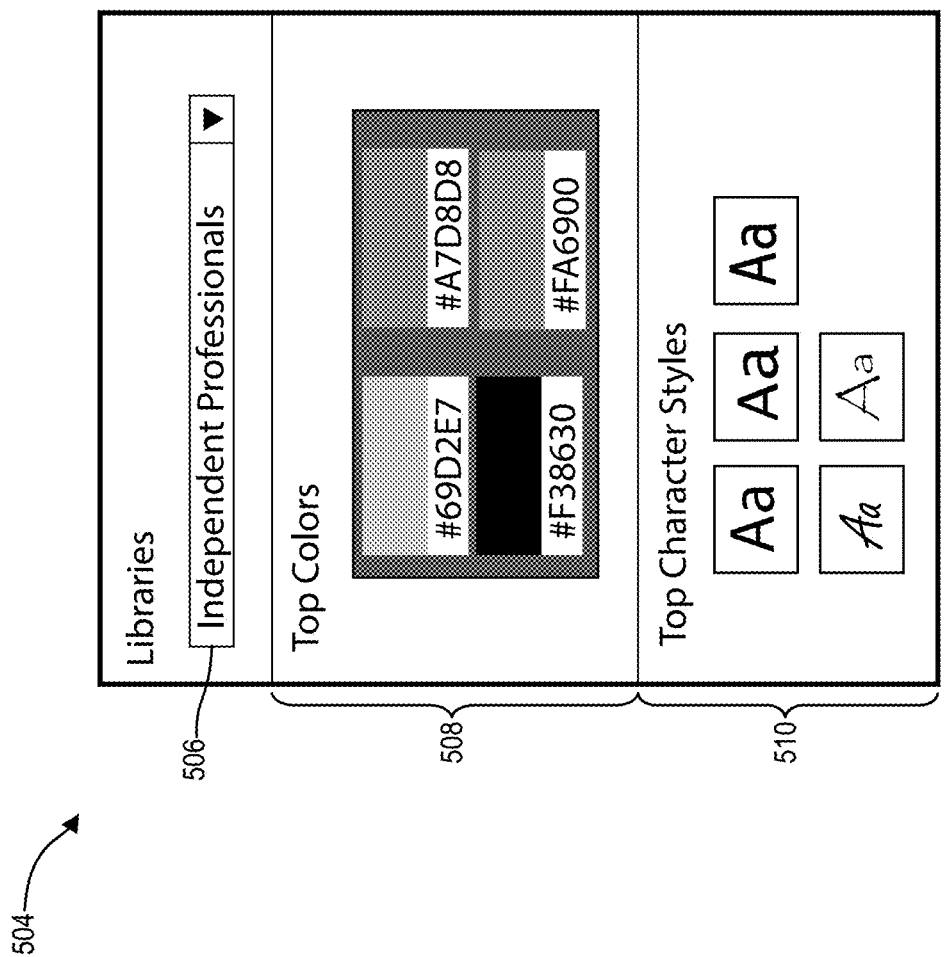
Figure 5C:
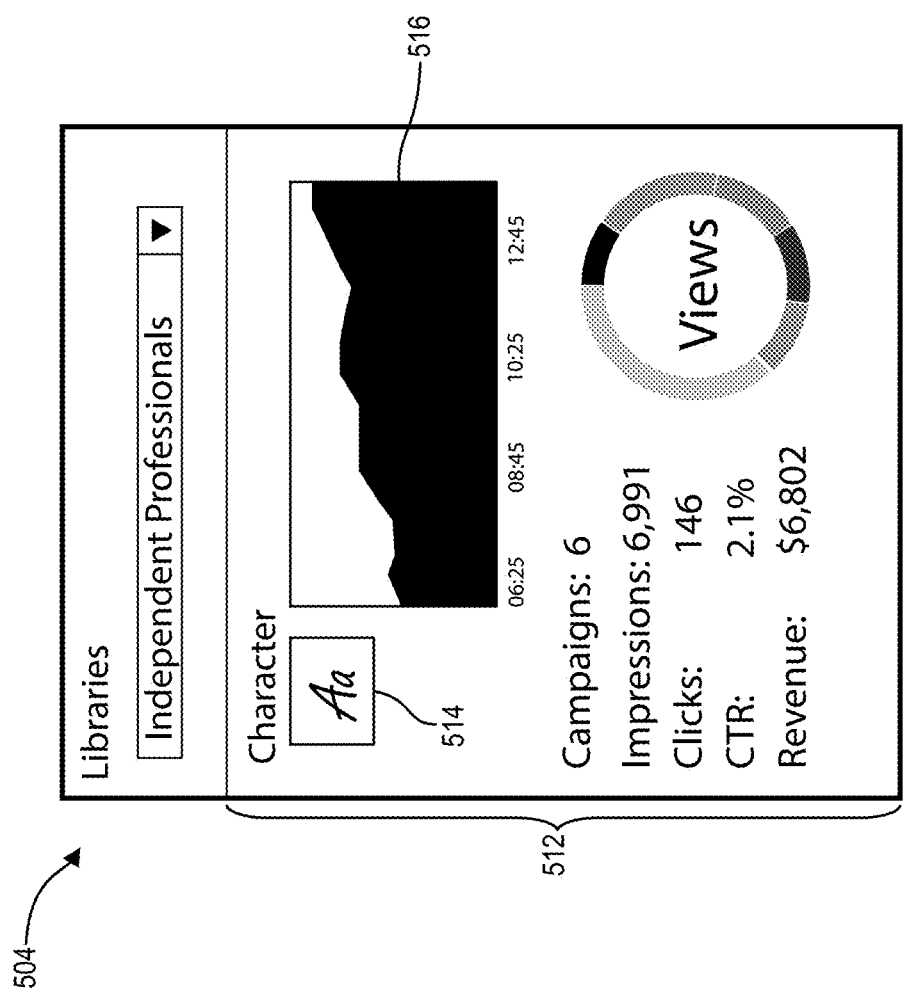

FIGS. 5A-5C illustrate user interfaces for analytics-based content creation. Specifically, FIGS. 5A-5C illustrate various embodiments of an asset creation application 500 that allows a user to create and/or modify digital design assets. For instance, the asset creation application 500 can provide an interface and tools for creating and modifying images, video, audio, and/or text. Additionally, as mentioned above, the asset creation application 500 can provide analytics data to a content creator to allow the content creator to determine which attributes of digital design assets are likely to perform best for specific segments.

As illustrated in FIG. 5A, the asset creation application 500 is a digital asset editing application that includes an digital asset editing interface 502. The digital asset editing interface 502 allows a user to edit and/or create digital design assets. In particular, a user can create a new image for the asset management system to use in one or more marketing campaigns. For example, the user can create, view, modify, or otherwise interact with an image within the digital asset editing interface 502 using various digital asset editing tools and store the new image in the asset repository. Alternatively, the user can import an existing image from the asset repository, perform one more modifications to the imported image, and then store the modified image to the asset repository.

In one or more embodiments, the asset creation application 500 illustrated in FIGS. 5A-5C includes a digital asset editing interface for creating and editing a variety of digital assets. For example, the asset creation application 500 can allow a user to create and edit images, videos, and audio files for including in a digital asset repository. As such, the asset creation application 500 can include tools for editing or creating digital design assets for the corresponding type of digital design asset. Furthermore, the asset creation application 500 can be implemented on any client device, including a tablet or desktop, and can accept a variety of user inputs, as described in more detail with reference to FIG. 9.

In one or more embodiments, the asset creation application 500 includes an library panel 504 of the digital asset editing interface 502 to provide relevant analytics data to a user while the user is creating or editing a digital design asset. In particular, the library panel 504 can provide analytics data for digital design assets and attributes that the asset management system has used in one or more previous marketing campaigns. For example, the library panel 504 can be included as a toolbar (e.g., as part of a sidebar) for the asset creation application 500. Additionally, the user can opt to view the library panel 504 or hide the library panel 504 by selecting one or more preference settings in the asset creation application 500.

As mentioned, the asset creation application 500 provides the analytics data for assets and attributes to allow a user to determine which attributes are most likely to create a successful digital design asset. When the user is creating a new digital design asset, for example, the user can use the analytics data to choose one or more attributes indicated in the library panel 504 for using in a digital design asset. The user can then incorporate the selected attributes into the digital design asset. By incorporating, into a digital design asset, the attributes that are indicated to have a higher chance of interaction by users, the content creator user can improve the likelihood of an advertisement or other marketing content resulting in clicks, conversions, purchases, etc. of a product associated with the marketing content.

In one or more embodiments, the asset creation application 500 provides recommendations to use one or more attributes when creating a digital design asset. For example, the asset creation application 500 can access, in response to the user selecting an audience segment, analytics data for the selected audience segment and then provide one or more recommendations of attributes that perform well for the selected audience. In at least some implementations, the asset creation application 500 automatically selects one or more attributes and/or provides a template within the digital asset editing interface 502 based on the analytics data in response to the user selecting an audience segment. Thus, the asset creation application 500 can aid the user in creating content that is more likely to perform well for the selected audience.

In one or more embodiments, the library panel 504 is accessible via a plurality of different applications. Specifically, the asset management system can be associated with a suite of related applications that allow content creators to create various types of digital design assets. The asset management system can make the analytics data for marketing campaigns, digital design assets, and attributes available to any of the content creators through the suite of related applications. The asset management system can communicate with one or more server devices associated with the related applications and send the analytics data to the one or more servers. Thus, each application in the suite of related applications can provide the analytics data to the client devices of various users, such that each application can include the library panel 504 or a variation of the library panel 504 to display the analytics data.

Additionally, a user can customize the library panel 504 within the digital asset editing interface 502 by selecting viewing preferences within the asset creation application 500. For instance, the user can customize a position of the library panel 504 within the digital asset editing interface 502 by moving the library panel 504 to a position other than shown. The user can also view or hide the library panel 504 by selecting an option to view or hide the library panel 504 in the viewing preferences.

In one or more embodiments, the asset creation application 500 also allows a user to customize the information displayed within the library panel 504. In particular, the asset creation application 500 can allow a user to view information related to the user's own created content in the library panel 504. For instance, digital design assets that the user creates can be displayed within the library panel 504 if the user selects an option to view the user's created content (e.g., "My Library"). The user's content can also include metadata that allows the library panel 504 to display attributes of the user's content including fonts, colors, subjects, etc., as in the analytics data for digital design assets. The digital design assets that the user creates may be stored in a cloud storage system such that the user can access the user's content from any location, device, or application associated with the asset management system.

Additionally, the asset creation application 500 allows a user to customize the library panel 504 to display information associated with digital design assets that other users created and/or were used in one or more marketing campaigns. Specifically, the library panel 504 can include information associated with one or more marketing campaigns and/or one or more audience segments. FIGS. 5B-5C illustrate different information that is available within the library panel 504 according to the analytics data that the asset management system collected. In particular, FIG. 5B illustrates the library panel 504 displaying analytics data for a selected audience segment. FIG. 5C illustrates the library panel 504 displaying analytics data for a selected attribute within the selected audience segment.

As illustrated in FIG. 5B, the library panel 504 includes a selection option that allows a user to select which library to display within the library panel 504. For instance, the selection option can be a dropdown menu 506 or any other mechanism for selecting or switching between different available libraries, such as a checkbox or radio button dialog. As mentioned, the user can select an option to view the user's library within the library panel 504. Alternatively, the user can select an option to view a library associated with a specific marketing campaign. In another example, as shown in FIG. 5B, the user can select an option to view a library associated with a specific audience segment (e.g., "Independent Professionals").

When a user selects an available option within the dropdown menu 506, the asset creation application retrieves library information for the selected option and displays the retrieved library information within the library panel 504. For example, the asset creation application can communicate with the asset management system via a network connection in response to the selection. Alternatively, the asset creation application can periodically synchronize with the asset management system to obtain library information for one or more libraries, such that the user can access library data locally.

In one or more embodiments, the asset management system can store information associated with one or more libraries with a user account for a user. For example, the user account can include a list of libraries to which the user has access. To illustrate, if the user has subscribed or is given permission to one or more libraries, the user account can reflect the access to the one or more libraries. Additionally, when synchronizing with the asset creation application 500, the asset management system can access the user account to determine which libraries to synchronize with the user's devices and then synchronize the data for the corresponding libraries to the user's devices.

After selecting a library, the library panel 504 displays one or more digital design assets for the selected library. In particular, selecting a library for a particular audience segment causes the library panel 504 to display the digital design assets that the asset management system used in marketing content targeted to the particular audience segment. Additionally, because the asset management system tracks the attributes of the digital design assets and maintains analytics data for the individual attributes, the asset management system can provide information about the attributes for display within the library panel 504. For example, the library panel 504 can display a plurality of attributes (e.g., colors, fonts/character styles, subjects).

In one or more embodiments, the asset creation application 500 displays the digital design assets and attributes associated with the selected audience segment according to the usage and/or performance of the digital design assets and attributes. As briefly mentioned previously, the asset creation application 500 can calculate a performance score for each of a plurality of marketing campaigns, digital design assets, and/or attributes. The performance score is based on the usage and performance analytics data for the corresponding campaign, asset, or attribute, as described in more detail below with respect to FIGS. 6A-6B. The performance score can indicate a relative performance of the corresponding campaign, asset, or attribute with respect to other campaigns, assets, or attributes. Because the asset management can determine a relative performance of each asset or attribute, the asset creation application 500 can retrieve the performance score for determining how to display analytics data in the library panel 504.

For instance, the library panel 504 can display a plurality of assets and/or attributes that performed well (e.g., as compared to a threshold or in comparison to other assets and/or attributes). To illustrate, the library panel 504 can display the top performing colors 508 or character styles 510 that were used in digital design assets for the selected audience segment. Furthermore, the library panel 504 can also display the top performing digital design assets for the selected audience segment. Because the assets and attributes are tracked independently, the top performing assets may include one or more of the top performing attributes, but do not necessarily include any of the top performing attributes. Instead, the top performing attributes are based on all of the digital design assets including those attributes used in connection with the selected audience segment across one or more marketing campaigns, and thus may be from many different digital design assets.

In addition to providing the top performing attributes and assets, the library panel 504 can display the worst performing attributes and assets. Providing the best and worst performing attributes and assets in the library panel 504 of the asset creation application 500 can allow a user to quickly determine which assets and/or attributes are most likely to be successful in marketing campaigns for the selected audience segment. Furthermore, the library panel 504 can provide detailed information about the analytics data for an attribute or asset in response to the user selecting the attribute or asset.

For example, FIG. 5C illustrates the library panel 504 including a summarized analytics report 512 for a selected attribute 514. In particular, the summarized analytics report 512 includes analytics data that the asset management system collected for the selected attribute 514 across one or more campaigns and in connection with the selected audience segment. To illustrate, the summarized analytics report 512 can include, but is not limited to, the number of campaigns in which the attribute has been used, the number of impressions for digital design assets that include the attribute, the number of clicks for digital design assets that include the attribute, the click-through-rate for digital design assets that include the attribute, the revenue resulting from digital design assets that include the attribute, a performance comparison relative to top performing attributes, and/or a performance score of the attribute. In one or more embodiments, the summarized analytics report 512 also allows a user to customize which information is displayed in the summarized analytics report 512.

Additionally, the summarized analytics report 512 can include trend information associated with the selected attribute 514. For instance, the trend information can include a graph 516 indicating one or more performance metrics for the selected attribute 514 over time. To illustrate, the graph 516 can display one or more charted lines corresponding to one or more metrics (e.g., the click-through-rate, impressions) over time. A user can thus determine whether the attribute is trending upward, downward, or maintaining a consistent performance.

Based on analytics data and other information provided in the library panel 504, a user can generate new digital design assets or modify existing digital design assets that are more likely to be successful for an intended audience segment. In one example, the library panel 504 allows a user to select a digital design asset to insert into the digital asset editing interface 502 illustrated in FIG. 5A to use as a starting point. The user can then modify or create a digital design asset using on the selected digital design asset. For example, the user can use the selected digital design asset to create a similar digital design asset that has one or more different attributes (e.g., background subject, subject, font) from the top performing attributes.

Additionally, a user can select one or more additional attributes from within the library panel 504 to use in the digital asset editing interface 502. Specifically, selecting an attribute from the library panel 504 can cause the asset creation application 500 to set a parameter of a corresponding tool to the selected attribute. To illustrate, selecting a character style from the library panel 504 can cause the asset creation application 500 to change the currently selected font to the selected character style. Thus, the user can quickly change settings associated with one or more other tools in the digital asset editing interface 502 via the library panel 504.

In one or more embodiments, the asset management system automatically creates new digital design assets based on previous digital design assets and corresponding attributes. Specifically, the asset management system can leverage the analytics data associated with assets and attributes to identify the characteristics of successful digital design assets. For instance, the asset management system can use machine learning to identify the characteristics (e.g., attributes) and then apply the identified characteristics to new or modified digital design assets. Thus, the asset management system can create new digital design asset for use in marketing campaigns without the aid of additional user input.

Figure 6A:
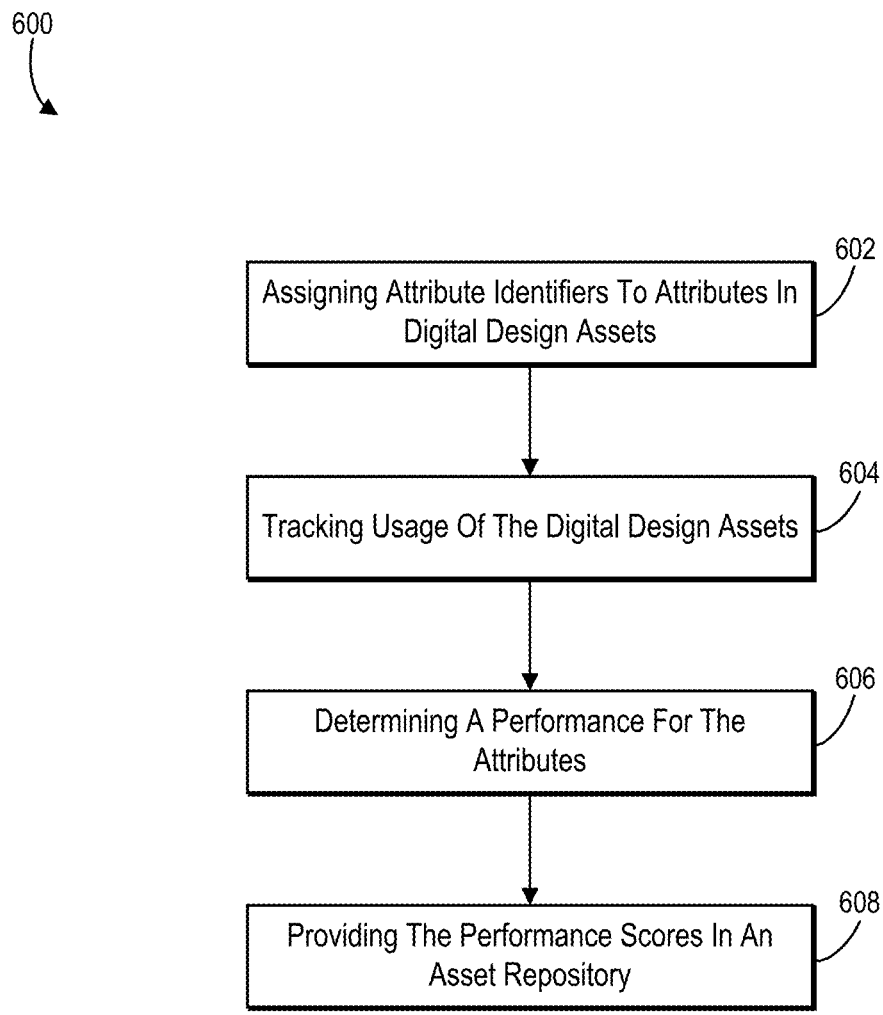
FIGS. 6A-6B illustrate flowcharts of a method of assessing performance of individual asset attributes in accordance with one or more embodiments.
Figure 6B:
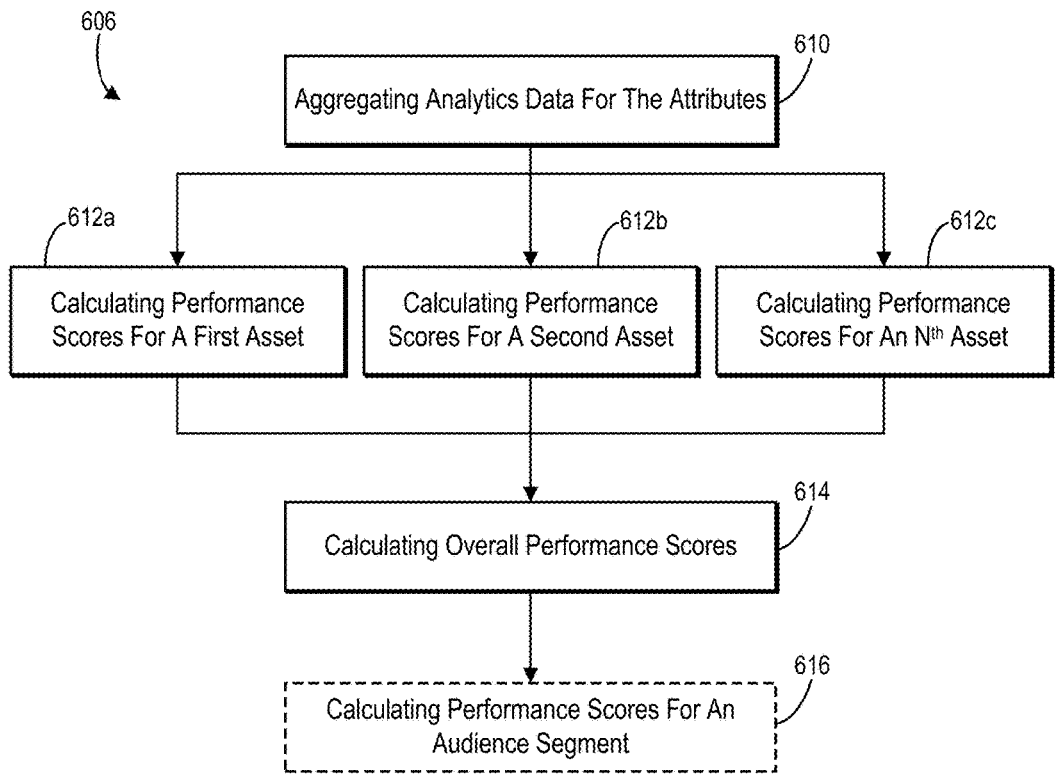

FIGS. 6A-6B illustrate flowcharts of a method 600 of assessing individual asset attribute performance. In particular, the asset management system assigns attribute identifiers to attributes in digital design asset 602. For example, the asset management system assigns an attribute identifier, such as a tracking code, to each attribute in a digital design asset separately from an asset identifier for the asset. To illustrate, the asset management can assign the attribute identifiers to the attributes by storing the attribute identifiers as metadata in the digital design assets. Additionally, the asset management system can assign an attribute that is used in more than one digital design asset the same attribute identifier to the attribute in each of the digital design assets.

After assigning the attribute identifiers to each of a plurality of identified attributes in the digital design assets, the asset management system tracks usage of the digital design assets 604. Specifically, the asset management system tracks the usage of the digital design assets across one or more marketing campaigns. For example, the asset management system uses asset identifiers assigned to the digital design assets to determine when and where the digital design assets are used in marketing content. Each time a digital design asset is used in marketing content for a marketing campaign, the asset management system tracks the usage of the asset and attributes of the asset based on the asset identifier and the attribute identifiers.

The method 600 also includes a step 606 for determining performance scores for the attributes. As described in more detail with reference to FIG. 6B, step 606 involves the asset management system gathering the analytics data for an attribute and calculating a performance score for the attribute based on the analytics data. Specifically, the asset management system generates performance scores that allow the asset management system to determine a performance of each attribute relative to other attributes or to a performance scale. Additionally, the performance score allows the asset management system to provide useful analytics data to users creating or updating digital design assets.

Additionally, after the asset management system determines the performance scores for the attributes, the asset management system provides the performance scores in an asset repository 608 in which the digital design assets are stored. For instance, the asset management system can store the usage and performance scores of the attributes with analytics data corresponding to the asset identifier and attribute identifiers. To illustrate, the asset management system can store the analytics data in a table or database that maps the usage and performance scores to the corresponding attributes, as well as to the digital design assets and campaigns in which the asset management system used the attributes.

As mentioned, FIG. 6B illustrates a flowchart of a series of acts associated with step 606 of FIG. 6B. Specifically, determining performance scores for the attributes first includes aggregating analytics data for the attributes 610. For example, the asset management system determines when and where each attribute was used in marketing content based on tracking the attribute identifiers in connection with one or more marketing campaigns. To illustrate, the asset management system can use the tracked information to generate a report that includes the usage information of one or more attributes.

The asset management system also determines whether a digital design asset resulted in interactions by one or more users. In particular, the asset management system can determine that a digital design asset resulted in a click, conversion, purchase, or other interaction by a user. By mapping the asset identifiers to attribute identifiers, the asset management system can also determine that the attributes corresponding to the digital design asset that resulted in user interactions are associated with the user interactions. The asset management system can aggregate the analytics data for an attribute by combining the usage (e.g., when and where the attribute is used) and performance data (user interaction data).

According to one or more embodiments, the asset management system also classifies attributes into one or more classes for aggregating the analytics data. In particular, the asset management system can determine a plurality of attribute categories for the attributes by determining one or more attribute types of each attribute. For example, the asset management system can assign attributes related to a background characteristic of a digital design asset to a background class. The classes can be based on various visual characteristics that a digital design asset may have, such as, but not limited to, font, font size, font color, asset palette, subject, subject gender, subject color, background subject, background color, and dimensions. The asset management system can determine to which class a particular attribute belongs (e.g., using metadata in a corresponding asset) and then aggregate the analytics data for the class.

After aggregating the analytics data for each of a plurality of attributes, the asset management system determines performance scores for the attributes. The asset management system calculates a performance score for each individual attribute for each asset that included the attribute. Specifically, step 606 involves the asset management system calculating performance scores for a first asset 612a, calculating performance scores for a second asset 612b, and calculating performance scores for an Nth asset 612c, and so on. For instance, the asset management system can calculate a performance score for an attribute of a particular asset as:

$$A_S(a_1) = w_1 i_1 + w_2 i_2 + \ldots + W_n i_n,$$

where $A_S$ is the performance score for a particular attribute; $a_1$ represents a particular asset; $i_1, i_2, \ldots, i_n$ are interactions with assets that include the attribute, characteristics of the attribute, category (or type) to which the attribute belongs, or other analytics data associated with the attribute; and $w_1, w_2, \ldots, w_n$ are configurable weights applied to each interaction based on goals for the assets or to campaigns including the assets. To illustrate, the asset management system can use the interactions, as described previously, as well as interactions such as comments, likes, and shares corresponding to marketing content to determine the performance scores for the attribute for each asset.

After determining calculating the performance scores for attributes for each asset in which the attributes were used, the asset management system calculates overall performance scores 614 for the attributes. In particular, the asset management system calculates the performance score S as:

$$S = A_S(a_1) + A_S(a_2) + \ldots + A_S(a_n),$$

which combines the performance score for each of the campaigns $a_1, a_2, \ldots, a_n$ across one or more marketing media.

In one or more embodiments, the step 606 also optionally involves the asset management system calculating performance scores for an audience segment 616. Specifically, in response to a request to view analytics data for an attribute in connection with a selected audience segment, the asset management system can calculate a performance score for the attribute for just that audience segment. To illustrate, if a user selects an option to view analytics data for an "Independent Professionals" audience segment, the asset management system can generate a performance score for the attribute for the "Independent professionals" audience segment. For instance, similar to above, the asset management system can calculate a performance score for an attribute for a particular segment as:

$$A_S(AS_1) = w_1 i_1 + w_2 i_2 + \ldots + W_n i_n,$$

where $AS_1$ represents the selected audience segment, $i_1, i_2, \ldots, i_n$ are interactions with assets that include the attribute in connection with the audience segment, and $w_1, w_2, \ldots, w_n$ based on various characteristics of the audience segment or goals associated with providing marketing content to the audience segment.

As mentioned, once the asset management system has determined performance scores for the attributes, the asset management system can provide the performance scores with the attributes in an asset repository. For example, the asset management system can store the performance scores as analytics data and map the performance scores to the corresponding attributes based on the attribute identifiers. When a user attempts to retrieve the analytics data and performance scores, the asset management system can then use the attribute identifier to retrieve the analytics data for the attribute.

Although FIG. 6B illustrates a step 606 for determining a performance for an attribute by calculating a performance score for the attribute based on performances scores for assets including the attribute, the step 606 can also include determining a performance for an attribute in a direct comparison of analytics data for the attribute to analytics data for other attributes. For example, the asset management system can collect analytics data for a plurality of different attributes of one or more attribute types by aggregating the number of interactions associated with digital design assets including the attributes. The asset management system can then determine a performance for each attribute by comparing the aggregated interactions associated with the attribute (e.g., associated with one or more digital design assets including the attribute) to the aggregated interactions associated with other attributes of the same attribute type or category. To illustrate, the asset management system can determine a performance of a specific font in digital design assets by comparing the number of impressions for digital design assets including the font with the number of impressions for digital design assets including other types of fonts. If digital design assets including the font performed better than digital design assets including other fonts, the asset management system can determine that the font has a higher performance than the other fonts.

FIGS. 1-6B, the corresponding text, and the examples, provide a number of different systems and devices for using asset attribute usage and performance to improve asset creation. In addition to the foregoing, embodiments can be described in terms of flowcharts comprising acts and steps in a method for accomplishing a particular result. For example, FIG. 7 illustrates a flowchart of exemplary methods in accordance with one or more embodiments.

Figure 7:
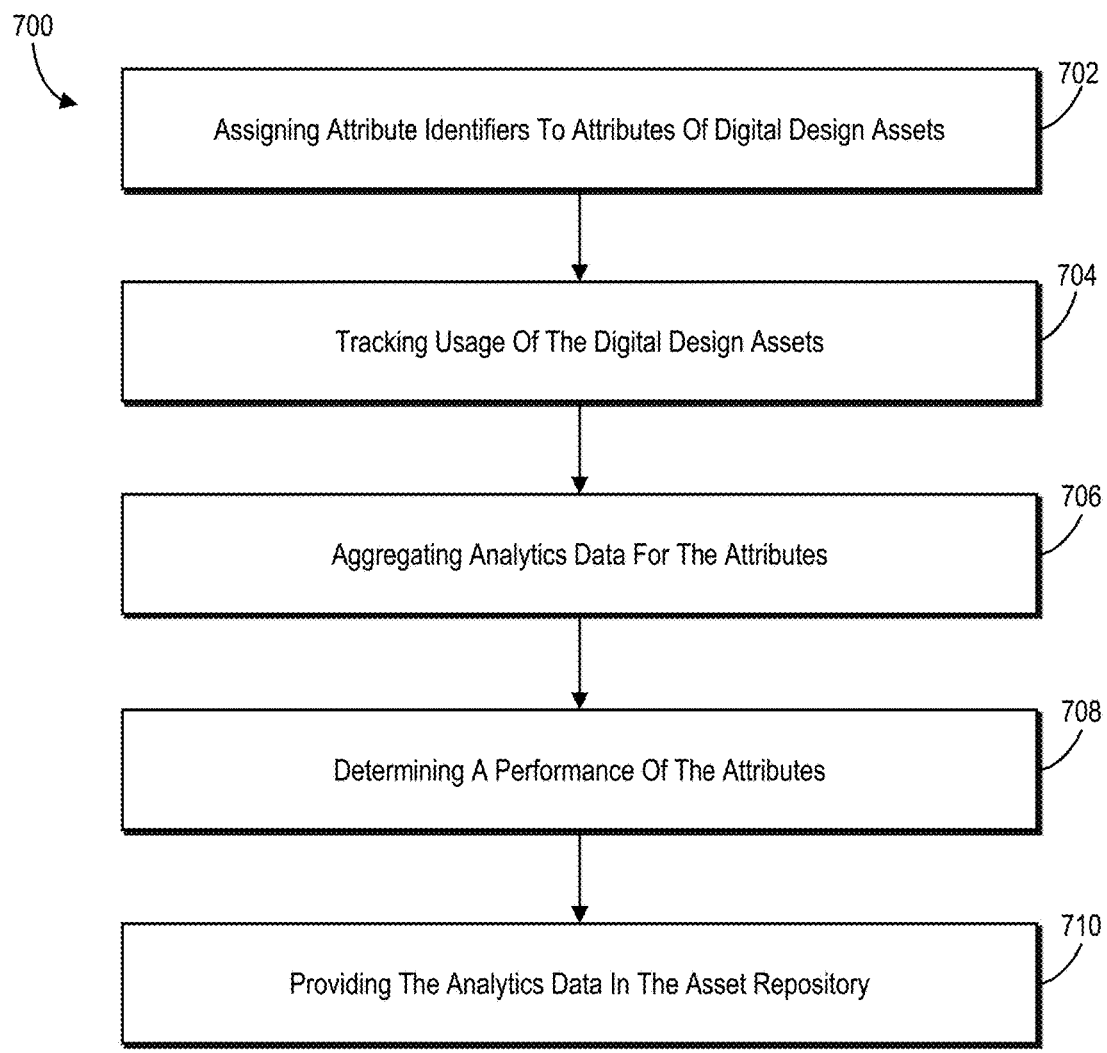
FIG. 7 illustrates a flowchart of a series of acts in a method of analyzing performance of digital design assets for asset selection in accordance with one or more embodiments.

FIG. 7 illustrates a flowchart of a series of acts in a method 700 of assessing individual asset attribute performance. The method 700 includes an act 702 of assigning attribute identifiers to attributes of digital design assets. For example, act 702 involves assigning a plurality of attribute identifiers to a plurality of attributes of digital design assets maintained in a digital design asset repository, the digital design assets comprising digital images, video files, or audio files available for use in marketing campaigns. The plurality of attributes can include audiovisual attributes of the digital design assets. For example, the plurality of attributes can include one or more characteristics related to colors, backgrounds, subjects, fonts, or dimensions of the digital design assets.

Act 702 can involve assigning a first attribute identifier to a first attribute in a first digital design asset and a second attribute identifier to a second attribute of the first digital design asset. Additionally, a second digital design asset can include the first attribute. Act 702 can further involve assigning a first asset identifier to the first digital design asset and a second asset identifier to the second digital asset.

Act 702 can also involve determining a plurality of attribute categories for the plurality of attributes, and assigning each attribute from the plurality of attributes to a category from the plurality of attribute categories. Additionally, act 702 can involve aggregating analytics data for all attributes in a category of attributes.

The method 700 also includes an act 704 of tracking usage of the digital design assets. For example, act 704 involves tracking usage of the digital design assets in one or more marketing campaigns. Act 704 can involve tracking the usage of the digital design assets using asset identifiers assigned to the digital design assets. Act 704 can also involve tracking the usage of the digital design assets in marketing content associated with the one or more marketing campaigns. Furthermore, act 704 can involve tracking interactions by users with marketing content that includes the digital design assets. For example, act 704 can involve tracking usage of the first digital design asset and the second digital design asset in the one or more marketing campaigns.

Additionally, the method 700 includes an act 706 of aggregating analytics data for the attributes. For example, act 706 involves aggregating, using the plurality of attribute identifiers, analytics data for the plurality of attributes based on the tracked usage of the digital design assets in the one or more marketing campaigns. Act 706 can involve aggregating, using the first attribute identifier and the second attribute identifier, the analytics data for the first attribute and the second attribute independently from analytics data for the first digital design asset.

Act 706 can also involve aggregating the analytics data for the plurality of attributes for a selected marketing campaign or for a selected audience segment. For example, act 706 can involve aggregating analytics data for the first digital design asset and the second digital design asset, and associating the aggregated analytics data for the first digital design asset and the second digital design asset with the first attribute. Thus, act 706 can involve aggregating analytics data for a plurality of digital design assets in a selected marketing campaign, and aggregated analytics data for attributes based on the digital design assets that include the attributes.

The method 700 further includes an act 708 of determining a performance of the attributes. For example, act 708 involves determining, based on the aggregated analytics data, a performance of each of the plurality of attributes of the digital design assets. Act 708 can involve determining a performance score for each of the plurality of attributes based on impressions and interactions with digital design assets in which the plurality of attributes have been used in one or more marketing campaigns.

As part of act 708, or as an additional act, the method 700 can include determining, in connection with the target audience segment, a performance score for each attribute from the plurality of attributes, and ranking, based on the determined performance scores, the plurality of attributes for the target audience segment. For example, the method 700 can include determining the performance score for each attribute from the plurality of attributes based on impressions and interactions with marketing content in which the attribute has been used in one or more marketing campaigns.

The method 700 also includes an act 710 of providing the analytics data in the asset repository. For example, act 710 involves providing the aggregated analytics data for each of the plurality of attributes. Act 710 can involve storing the aggregated analytics data and performance of the plurality of attributes in a database comprising mappings between the plurality of attributes and the analytics data and the performance of the plurality of attributes.

Act 710 can also involve providing the aggregated analytics data to a plurality of applications in an application suite, the plurality of applications comprising an asset creation application. For example, act 710 can involve maintaining the aggregated analytics data on one or more servers, and providing access to the one or more servers to the plurality of applications.

Act 710 can also involve receiving, from a client device, an indication of a selected audience segment, determining, based on the aggregated analytics data, a performance of the plurality of attributes for the selected audience segment, and providing, to the client device for display within the asset creation application, the performance of the plurality of attributes for the selected audience segment. Alternatively, act 710 can involve receiving, from a client device, an indication of a selected marketing campaign, determining, based on the aggregated analytics data, a performance of the plurality of attributes for the selected marketing campaign, and providing, to the client device for display within the asset creation application, the performance of the plurality of attributes for the selected marketing campaign.

The method 700 can also include receiving, from a client device, a request to provide the analytics data and the performance of the plurality of attributes for a target audience segment, and providing, to the client device, the analytics data and the performance of the plurality of attributes for the target audience segment. For example, the method 700 can include receiving a selection of a target audience segment, accessing analytics data of an attribute for the target audience segment, and providing a performance of the attribute to the client device based on the analytics data for the target audience.

Figure 8:
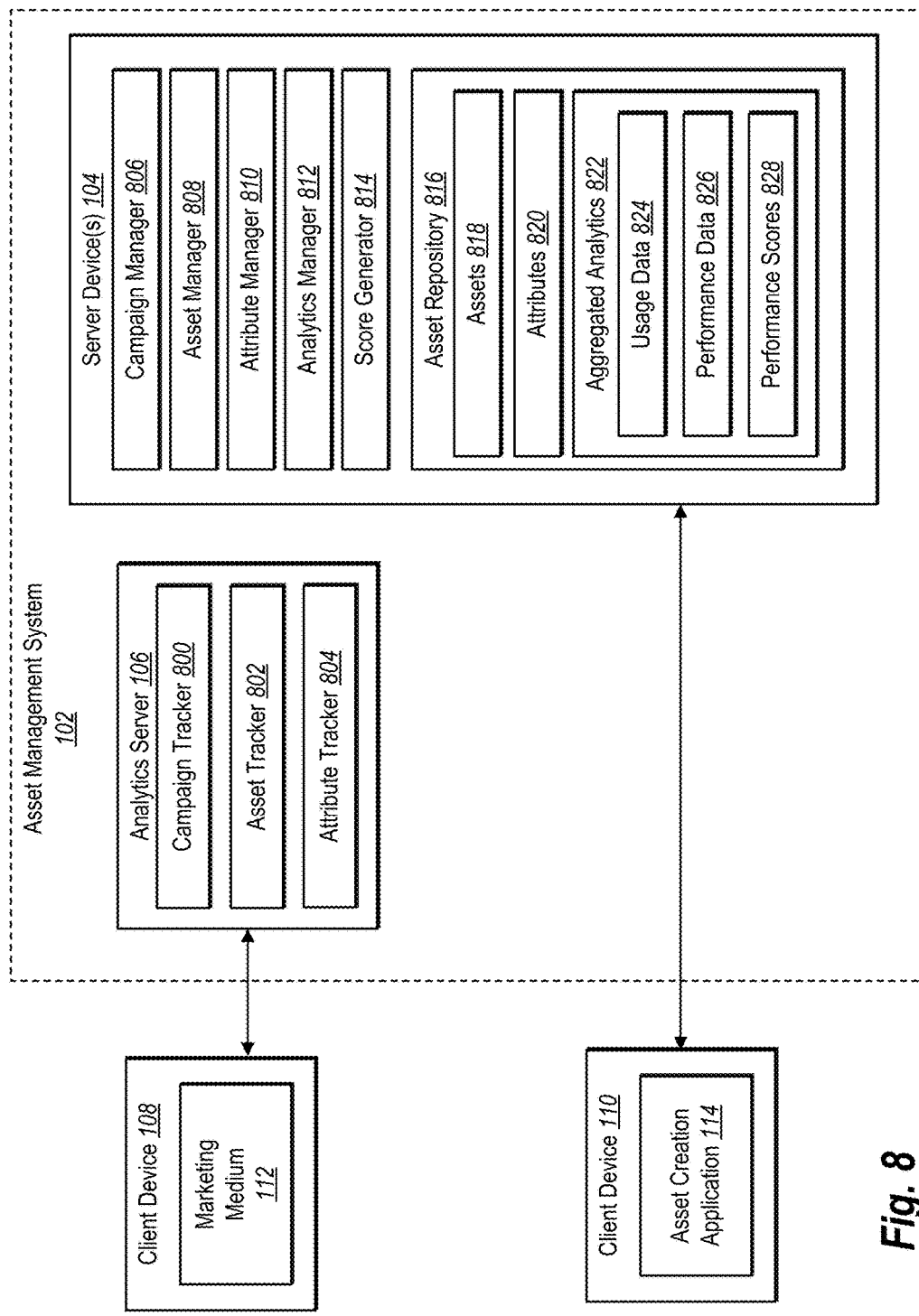
FIG. 8 illustrates a schematic diagram of the asset management system of FIG. 1 in accordance with one or more embodiments.

FIG. 8 illustrates a detailed schematic diagram of an embodiment of the asset management system 102 of FIG. 1. As previously described, the system 102 can include, but is not limited to, server device(s) 104 and an analytics server 106, and can communicate with client devices 108, 110. Although the system 102 of FIG. 8 is depicted as having various components, the asset management system 102 may have any number of additional or alternative components. For example, the server device(s) 104 and the analytics server 106 can be implemented on a single computing device or on multiple computing devices within the asset management system 102. Additionally, the asset management system 102 can include a plurality of server devices interacting with the analytics server 106 and the client devices 108, 110 to provide data (e.g., content or analytics data) to the client devices 108, 110 and receive analytics data from the analytics server 106. For example, the asset management system 102 can include a distributed system of server devices for providing marketing content to the client device 108 and managing received analytics data.

In one or more embodiments, each of the components 800-828 of the asset management system 102 are in communication with one another using any suitable communication technologies. Additionally, the components of the asset management system 102 can be in communication with the client devices 108, 110 and their components. It will be recognized that although the components of the analytics server 106 and the server device(s) 104 of the asset management system 102 are shown to be separate in FIG. 8, any of the subcomponents may be combined into fewer components, such as into a single component, or divided into more components as may serve a particular implementation. Furthermore, although the components of FIG. 8 are described in connection with the asset management system 102, at least some of the components for performing operations in conjunction with the asset management system 102 described herein may be implemented on other devices within the environment.

The components 800-828 of the asset management system 102 can include software, hardware, or both. For example, the components 800-828 of the asset management system 102 can include one or more instructions stored on a computer-readable storage medium and executable by processors of one or more computing devices (e.g., the server device(s) 104, the analytics server 106, or the client devices 108, 110 or devices in communication with the server device(s) 104 or the analytics server 106). When executed by the one or more processors, the computer-executable instructions of the asset management system 102 can cause the computing device(s) to perform the asset management methods described herein. Alternatively, the components 800-828 of the asset management system 102 can comprise hardware, such as a special purpose processing device to perform a certain function or group of functions. Additionally or alternatively, the components 800-828 of the asset management system 102 can comprise a combination of computer-executable instructions and hardware.

Furthermore, the components 800-828 of the asset management system 102 performing the functions described herein with respect to the asset management system 102 may, for example, be implemented as part of a stand-alone application, as a module of an application, as a plug-in for applications including content management applications, as a library function or functions that may be called by other applications, and/or as a cloud-computing model. Thus, the components 800-828 of the asset management system 102 may be implemented as part of a stand-alone application on a personal computing device or a mobile device. Alternatively or additionally, the components of the asset management system 102 may be implemented in any application that allows creation and delivery of marketing content to users, including, but not limited to, applications in ADOBE MARKETING CLOUD, such as ADOBE ANALYTICS, ADOBE AUDIENCEMANAGER, ADOBE CAMPAIGN, ADOBE EXPERIENCE MANAGER, ADOBE MEDIA OPTIMIZER, ADOBE PRIMETIME, ADOBE SOCIAL, ADOBE TARGET, and ADOBE PHOTO SHOP. "ADOBE", "ADOBE MARKETING CLOUD", "ADOBE ANALYTICS", "ADOBE AUDIENCEMANAGER", "ADOBE CAMPAIGN", "ADOBE EXPERIENCE MANAGER", "ADOBE PRIMETIME", "ADOBE SOCIAL", "ADOBE TARGET", and "PHOTOSHOP" are registered trademarks of Adobe Systems Incorporated in the United States and/or other countries.

As previously described, the asset management system 102 can communicate with a client device 108. In one or more embodiments, the client device 108 can include a marketing medium 112. Specifically, the client device 108 can include a marketing medium 112 that allows the server device(s) 104 to deliver marketing content in connection with one or more marketing campaigns to the client device 108. For example, the marketing medium 112 can include, or be part of, a client application at the client device 108 to display the marketing content to a user of the client device 108. To illustrate, the marketing medium 112 can display marketing content via a standalone application of the client device 108, a third party plugin of an application on the client device 108, or a combination of applications on the client device 108. Although not shown, the client device 108 can include a plurality of marketing media that allow the server device(s) 104 to deliver various types of marketing content for display at the client device 108.

Additionally, the asset management system 102 can communicate with a client device 110 that includes an asset creation application 114. In particular, the client device 110 can run the asset creation application 114 to allow a content creator to create digital design assets for use in one or more marketing campaigns. The client device 110 can communicate with the asset management system 102 to send and receive data related to the creation and management of digital design assets. To illustrate, the client device 110 can send digital design assets to the asset management system 102 and receive analytics data corresponding to the digital design assets to aid the content creator in creating successful digital design assets. The client device 110 can include additional asset creation applications or tools that allow the content creator to create or modify digital design assets.

The asset management system 102 can also include an analytics server 106 to facilitate collecting analytics associated with a plurality of marketing campaigns. The analytics server 106 can include, but is not limited to, a campaign tracker 800, an asset tracker 802, and an attribute tracker 804. In one or more embodiments, the campaign tracker 800 can track usage and performance of a plurality of marketing campaigns provided to client devices using campaign identifiers. Specifically, the campaign tracker 800 can communicate with the client device 108 to identify marketing campaigns used in connection with the marketing medium 112 on the client device 108. Additionally, the campaign tracker 800 can communicate with the client device 108 to identify interactions by one or more users with advertisements or other marketing content associated with the marketing campaigns.

More specifically, the campaign tracker 800 can track the use of specific marketing content and marketing campaigns. For example, the campaign tracker 800 can assign a campaign identifier to each piece of marketing content associated with a given marketing campaign. Thus, each time marketing content associated with a marketing campaign is used, the campaign tracker 800 can track the use and associate the use with the marketing campaign. Additionally, the campaign tracker 800 can assign a marketing content identifier to each piece of marketing content to allow the tracking of specific marketing content. Thus, the campaign tracker 800 can track and provide analytics for two separate advertisements (e.g., marketing content) that are both associated with the same marketing campaign.

The analytics server 106 can also include an asset tracker 802 to track usage and performance of one or more individual digital design assets provided to the client device 108. In particular, the asset tracker 802 can communicate with the client device 108 to identify digital design assets used in marketing content provided via the marketing medium 112 at the client device 108. Additionally, the asset tracker 802 can communicate with the client device 108 to identify interactions by one or more users with the digital design assets. Although digital design assets provided to the client device 108 are provided in connection with one or more marketing content, the asset tracker 802 can track usage and performance of the digital design assets separately from the advertisements or other marketing content of the marketing campaigns to provide a better understanding of how well the digital design assets are performing.

In at least some embodiments, the asset tracker 802 can track an asset based on an asset identifier associated with the asset. Specifically, the asset identifier associated with the digital design asset can be embedded in the digital design asset provided to the client device 108 via the marketing medium 112. When the analytics server 106 communicates with the client device 108, the asset tracker 802 can identify the asset identifier and use the asset identifier to associate any analytics data with the corresponding digital design asset. As mentioned previously, because the digital design asset contains its own asset identifier, the asset tracker 802 can track the asset and collect analytics data for the asset separately from the marketing campaign and marketing content in which the digital design asset is used.

Furthermore, the analytics server 106 also includes an attribute tracker 804 to track usage and performance of one or more individual attributes of digital design assets provided to the client device 108. In particular, the attribute tracker 804 can communicate with the client device 108 to identify attributes of marketing content (e.g., digital design assets) provided via the marketing medium 112 at the client device 108. Additionally, the attribute tracker 804 can communicate with the client device 108 to identify interactions by one or more users with digital design assets including the identified attributes. For example, the attribute tracker 804 can detect attribute identifiers embedded in a digital design asset provided to the client device 108. Alternatively, in response to receiving an asset identifier, the attribute tracker 804 can determine attribute identifiers based on a mapping of digital design assets to attributes stored in a database (e.g., the asset repository 816). The attribute tracker 804 can also track usage and performance of the attributes independently from the digital design assets, marketing content, and campaigns.

As mentioned, the asset management system 102 can include server device(s) 104 that include, but are not limited to, a campaign manager 806, an asset manager 808, an attribute manager 810, an analytics manager 812 and a score generator 814, and a digital design asset repository (or simply "asset repository" 816). In one or more embodiments, the server device(s) 104 can include a campaign manager 806 to facilitate selection of marketing campaigns for delivering marketing content to users. In particular, the campaign manager 806 can determine whether to use a given marketing campaign in connection with the marketing medium 112 at the client device 108. For example, the campaign manager 806 can select from a plurality of available marketing campaigns based on various criteria associated with selecting marketing campaigns, such as how often a particular campaign can be selected. In one or more embodiments, the campaign manager 806 can select the marketing campaign in response to a request from the client device 108 to deliver an advertisement or other marketing content to the client device 108.

In one or more embodiments, the campaign manager 806 can determine whether the given marketing campaign is compatible with the marketing medium 112 at the client device 108. Specifically, a marketing campaign may include certain types of marketing content that are available for presentation within certain applications with specific functionality. For example, a marketing campaign may include video content that is compatible only with applications at the client device 108 that are capable of displaying video content. Other applications at the client device 108 may limit the marketing content to digital images.

The asset management system 102 can also include an asset manager 808 to facilitate selection and delivery of digital design assets to deliver to the client device 108 or to other devices. The asset manager 808 can select one or more digital design assets in connection with a marketing campaign selected by the campaign manager 806. For example, the asset management system 102 can access the asset repository 816 to identify digital design assets that correspond to a selected marketing campaign and deliver the identified digital design assets to the client device 108 via the marketing medium 112. To illustrate, the asset manager 808 can select an advertisement or other marketing content approved for use with the selected marketing campaign to deliver to the client device 108 for displaying on a specific website in a web browser on the client device 108.

The asset management system 102 also includes an attribute manager 810 that facilitates the management of a plurality of attributes associated with digital design assets. Specifically, the attribute manager 810 can identify and classify (or categorize) attributes of various digital design assets, such as by analyzing metadata in the digital design assets, or by accessing a database that includes mappings of attributes to digital design assets. The attribute manager 810 can also determine the attribute identifiers of the attributes for communicating information about the attributes (e.g., asset classes) used in digital design assets to the asset repository 816. Because the attribute identifiers are distinct from asset identifiers and campaign identifiers, the attribute manager 810 can manage information about the attributes independently from the assets and campaigns.

The asset management system 102 can include an analytics manager 812 to facilitate management of analytics received from the analytics server 106. Specifically, the analytics manager 812 can receive and aggregate analytics data from the analytics server 106. For example, the analytics manager 812 can receive campaign tracking data, asset tracking data, and attribute tracking data from the analytics server 106 that the analytics server 106 collected from the client device 108 in connection with one or more marketing campaigns. The analytics manager 812 can aggregate the received analytics data to store with the attributes and digital design assets in the asset repository 816, as described below. The analytics manager 812 can also determine a performance of attributes based on the received analytics data, such as by comparing analytics data of two or more attributes within the same attribute category.

The asset management system 102 can also include a score generator 814 to facilitate calculating a performance score that can aid in improving marketing campaigns and digital design assets. In particular, the score generator 814 can use the aggregated analytics data to determine how well digital design asset, attributes of the asset, and/or a campaign is performing based on the usage and performance data aggregated by the asset manager 808. For example, the score generator 814 can determine the performance score based on the number and types of interactions with the marketing campaigns and/or digital design assets.

The asset repository 816 can store and manage digital design assets 818 for use in a plurality of marketing campaigns or otherwise. Specifically, the asset repository 816 can include various types of digital design assets 818 and information about the assets 818 (e.g., asset identifiers) for use in different marketing campaigns via various marketing media. For example, the digital design assets 818 can include, but are not limited to, digital images, video files, audio files, and/or any combination thereof. The asset repository 816 may include digital design assets 818 generated by content creators associated with an advertiser, commercial entity, or content provider that provides marketing content to users. To illustrate, when a content creator generates a new digital design asset, the content creator can store the digital design asset in the asset repository 816 so that the digital design asset becomes available for use in marketing campaigns or to other designers, marketers, web managers or other users associated with the content creator (e.g., others in the company for which the content creator works). In additional, or alternative, embodiments, the asset repository 816 can include digital design assets 818 obtained from third party sources.

Additionally, the asset repository can store and manage attributes 820 of the digital design assets 818. In particular, the asset repository 816 can include various classes of attributes that define one or more audiovisual characteristics of the digital design assets 818. For instance, the attributes 820 can include, but are not limited to, characteristics associated with categories such as colors, subjects, backgrounds, objects, audio features (e.g., music features, sound features), dimensions, video features (e.g., playback length, filming style, tone) and/or any combination thereof. The asset repository 816 maintains information (e.g., attribute identifiers) about the attributes 820 separately from the assets 818, such that various applications, such as the asset creation application 114 of the client device 110, can understand the performance of attributes independently from the assets 818.

The asset repository 816 can also store and manage the asset identifiers, attribute identifiers, and campaign identifiers in a mapping that allows the asset management system 102 to use the identifiers for managing and storing aggregated analytics 822. Specifically, the asset repository can manage and store the aggregated analytics 822 for the assets 818 and attributes 820 with the corresponding assets and attributes. For example, the aggregated analytics 822 stored with an attribute can include the usage data 824 and performance data 826 collected for the attribute by the analytics server 106 and aggregated at the analytics manager 812. To illustrate, the aggregated analytics 822 for a given attribute can include how many times the attribute has been used with a plurality of marketing campaigns and with which campaigns the attribute has been used. Additionally, the aggregated analytics 822 for the given attribute can include the number and types of user interactions and data associated with the user interactions for digital design assets including the given attribute.

The aggregated analytics 822 can additionally include the performance score 828 calculated for the given attribute. Specifically, providing the performance score 828 with the digital design asset can allow a content creator and/or advertiser or other entity to view how well the attribute is performing in a single value. For example, the performance score 828 can provide an objective metric for measuring against other attributes or against a scale of values to determine whether the attribute is performing well. The performance score 828 also allows for improving marketing campaigns by determining which attributes are performing best or how well a content creator is performing based on an average performance score of the creator's attributes.

In one or more embodiments, the performance score 828 can also provide insight into creating new digital design assets. In particular, the performance score 828 can allow content creators to generate new digital design assets to include attributes of digital design assets that have performed or are performing well. For example, the content creators can generate new digital design assets that are more likely to perform well by identifying and incorporating attributes with high performance scores into the new digital design assets. In at least some implementations, the asset management system 102 can automatically determine the attributes of digital design assets with high performance scores for incorporating into new digital design assets or for modifying existing digital design assets. The asset management system 102 can also provide recommendations of attributes or automatically select and insert attributes into a digital design asset, or into a template for a digital design asset, based on the performance scores 828 or other performance measurements.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
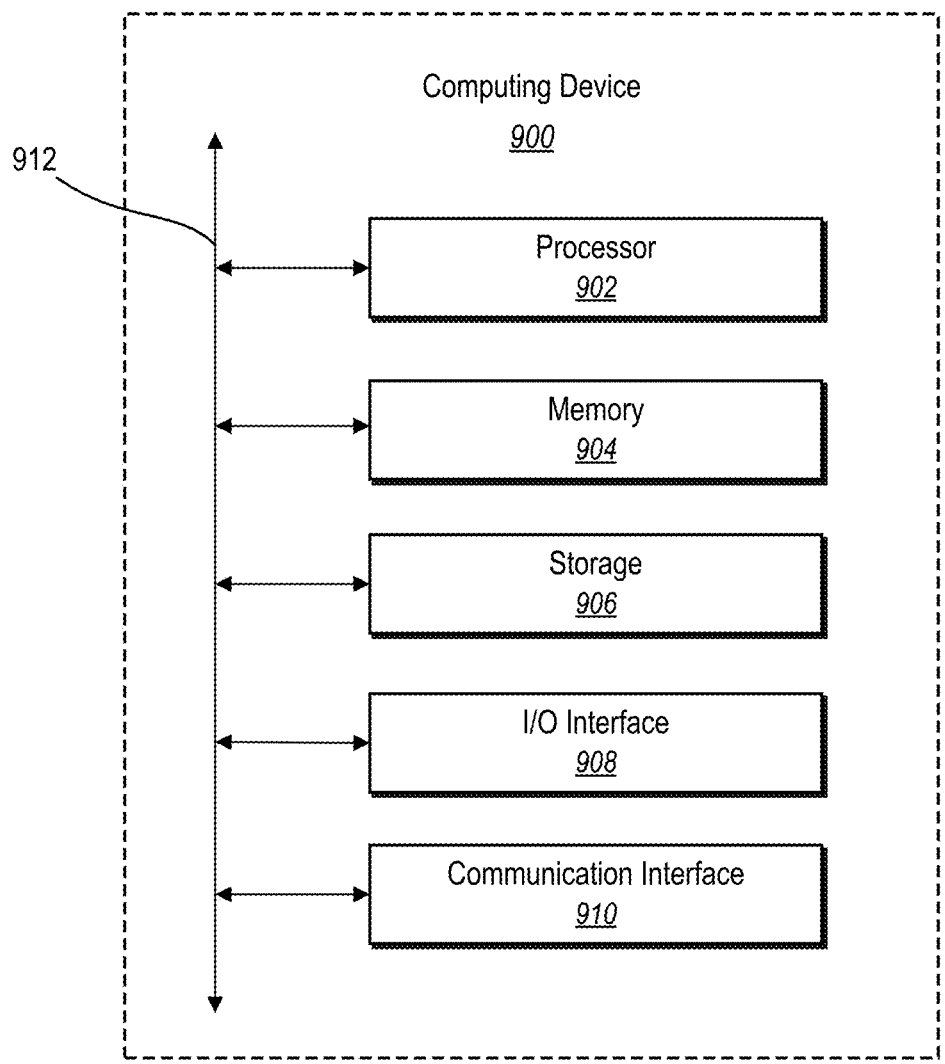
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the asset management system 102. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the asset and attribute management process can allow a plurality of devices (e.g., a client device and server devices) to exchange information using various communication networks and protocols for sharing information such as assets, attributes, marketing content, and analytics data.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for digital design asset management, a computer-implemented method for assessing individual asset attribute performance, comprising:
   assigning a plurality of attribute identifiers to a plurality of attributes of digital design assets maintained in a digital design asset repository, the digital design assets comprising digital images, video files, or audio files available for use in marketing campaigns, wherein the plurality of attributes comprises visual attributes or audio attributes of components of the digital design assets;
   tracking usage of the digital design assets in one or more marketing campaigns;
   aggregating, by one or more servers and using the plurality of attribute identifiers, analytics data for the plurality of attributes based on the tracked usage of the digital design assets in the one or more marketing campaigns;
   generating, by the one or more servers and based on the aggregated analytics data, performance scores for the plurality of attributes of the digital design assets, wherein a performance score of an attribute of the plurality of attributes indicates how well the attribute performed relative to other attributes of the plurality of attributes;
   receiving, from a client device of a user generating a new digital design asset, a selection of a target audience segment to view top performing attributes for the target audience segment;
   selecting, by the one or more servers based at least in part on the selection of the target audience segment, a set of attributes from the plurality of attributes based on performance scores of the set of attributes, the set of attributes comprising top performing attributes for the target audience segment; and
   providing, by the one or more to the client device, a recommended attribute from top performing attributes for the target audience segment for the user to use in generating the new digital design asset, wherein providing the recommended attribute causes the client device to display the recommended attribute as a selectable element within a portion of a user interface of a client application.

2. The computer-implemented method as recited in claim 1, wherein assigning the plurality of attribute identifiers to the plurality of attributes comprises assigning a first attribute identifier to a first attribute in a first digital design asset and a second attribute identifier to a second attribute of the first digital design asset.

3. The computer-implemented method as recited in claim 2, wherein a second digital design asset includes the first attribute.

4. The computer-implemented method as recited in claim 2, further comprising:
   aggregating, using the first attribute identifier and the second attribute identifier, the analytics data for the first attribute and the second attribute independently from analytics data for the first digital design asset.

5. The computer-implemented method as recited in claim 4, wherein:
   tracking usage of the digital design assets in the one or more marketing campaigns comprises tracking usage of the first digital design asset and the second digital design asset in the one or more marketing campaigns; and
   aggregating the analytics data for the first attribute comprises:
      aggregating analytics data for the first digital design asset and the second digital design asset; and
      associating the aggregated analytics data for the first digital design asset and the second digital design asset with the first attribute.

6. The computer-implemented method as recited in claim 1, wherein the plurality of attributes comprise audiovisual attributes of the digital design assets.

7. The computer-implemented method as recited in claim 1, wherein assigning the plurality of attribute identifiers to the plurality of attributes comprises:
   determining a plurality of attribute categories for the plurality of attributes; and
   assigning each attribute from the plurality of attributes to a category from the plurality of attribute categories.

8. The computer-implemented method as recited in claim 7, further comprising aggregating analytics data for all attributes in a category of attributes.

9. The computer-implemented method as recited in claim 1, further comprising providing the aggregated analytics data to a plurality of applications in an application suite, the plurality of applications comprising an asset creation application.

10. The computer-implemented method as recited in claim 9, wherein providing the recommended attribute comprises
   providing, to the client device, for display within the asset creation application, the aggregated analytics data for the recommended attribute.

11. The computer-implemented method as recited in claim 9, further comprising:
receiving, from the client device, an indication of a selected marketing campaign; and
providing, to the client device for display within the asset creation application, the aggregated analytics data for the plurality of attributes for the selected marketing campaign.

12. The computer-implemented method as recited in claim 1, further comprising providing worst performing attributes for the target audience segment based on performances scores of the worst performing attributes.

13. In a digital medium environment for digital design asset management, a system for assessing individual asset attribute performance, comprising:
a non-transitory computer memory comprising digital design assets; and
at least one computing device storing instructions thereon that, when executed by the at least one computing device, cause the system to:
assign a plurality of attribute identifiers to a plurality of attributes of the digital design assets maintained in a digital design asset repository, the digital design assets comprising digital images, video files, or audio files available for use in marketing campaigns;
track usage of the digital design assets in one or more marketing campaigns;
aggregate, using the plurality of attribute identifiers, analytics data for the plurality of attributes based on the tracked usage of the digital design assets;
generate, based on the aggregated analytics data and in connection with a target audience segment, performance scores for the plurality of attributes of the digital design assets, wherein a performance score of an attribute of the plurality of attributes how well the attribute performed relative to other attributes of the plurality of attributes;
select, based at least in part on the target audience segment, a set of attributes from the plurality of attributes based on performance scores of the set of attributes, the set of attributes comprising top performing attributes for the target audience segment; and
provide, to a client device of a user generating a new digital design asset, a recommended attribute from the top performing attributes for the target audience segment for the user to use in generating the new digital design asset, wherein providing the recommended attribute causes the client device to display the recommended attribute as a selectable element within a portion of a user interface of a client application.

14. The system as recited in claim 13, further comprising instructions that, when executed by the at least one computing device, cause the system to assign the plurality of attribute identifiers to the plurality of attributes by assigning a first attribute identifier to a first attribute in a first digital design asset and a second attribute identifier to a second attribute of the first digital design asset, wherein a second digital design asset comprises the first attribute.

15. The system as recited in claim 14, further comprising instructions that, when executed by the at least one computing device, cause the system to aggregate analytics data for the first attribute identifier and the second attribute identifier independently from the first digital design asset and the second digital design asset.

16. The system as recited in claim 13, further comprising instructions that, when executed by the at least one computing device, cause the system to:
receive, from the client device, a request to provide analytics data of an attribute of the plurality of attributes for the target audience segment; and
provide, to the client device, the analytics data of the attribute of the plurality of attributes for the target audience segment.

17. The system as recited in claim 16, further comprising instructions that, when executed by the at least one computing device, cause the system to
automatically select the recommended attribute to insert into the new digital design asset.

18. The system as recited in claim 13, wherein the instructions that, when executed by the at least one computing device, cause the system to generate the performance scores for the plurality of attributes cause the system to generate the performance scores based on impressions and interactions with marketing content in which the plurality of attributes have been used in one or more marketing campaigns.

19. In a digital medium environment for digital design asset management, a computer-implemented method for assessing individual asset attribute performance, comprising:
assigning a plurality of attribute identifiers to a plurality of attributes of digital design assets maintained in a digital design asset repository, the digital design assets comprising digital images, video files, or audio files available for use in marketing campaigns;
tracking usage of the digital design assets in one or more marketing campaigns;
a step for generating performance scores for the plurality of attributes of the digital design assets;
receiving, from a client device of a user generating a new digital design asset, a selection of a target audience segment to view top performing attributes for the target audience segment;
selecting, based at least in part on the selection of the target audience segment, a set of attributes from the plurality of attributes based on performance scores of the set of attributes, the set of attributes comprising top performing attributes for the target audience segment; and
providing, to the client device, a recommended attribute from the top performing attributes for the target audience segment for the user to use in generating the new digital design asset, wherein providing the recommended attribute causes the client device to display the recommended attribute as a selectable element within a portion of a user interface of a client application.

20. The computer-implemented method as recited in claim 19, wherein assigning the plurality of attribute identifiers to the plurality of attributes comprises assigning a first attribute identifier to a first attribute in a first digital design asset and a second attribute identifier to a second attribute in the first digital design asset.

* * * * *